United States Patent
Mitobe et al.

(10) Patent No.: US 11,886,071 B2
(45) Date of Patent: Jan. 30, 2024

(54) LIGHT GUIDE ELEMENT COMPRISING A DIFFRACTION ELEMENT HAVING A CHOLESTERIC LIQUID CRYSTAL LAYER WITH A PITCH GRADIENT

(71) Applicant: FUJIFILM Corporation, Tokyo (JP)

(72) Inventors: Fumitake Mitobe, Minamiashigara (JP); Katsumi Sasata, Minamiashigara (JP); Yukito Saitoh, Minamiashigara (JP); Akiko Watano, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/937,272

(22) Filed: Sep. 30, 2022

(65) Prior Publication Data

US 2023/0049424 A1 Feb. 16, 2023

Related U.S. Application Data

(63) Continuation of application No. PCT/JP2021/011127, filed on Mar. 18, 2021.

(30) Foreign Application Priority Data

Apr. 1, 2020 (JP) ................. 2020-065845

(51) Int. Cl.
*G02F 1/1335* (2006.01)
*G02F 1/137* (2006.01)
*G02B 27/01* (2006.01)

(52) U.S. Cl.
CPC .... *G02F 1/133524* (2013.01); *G02F 1/13718* (2013.01); *G02F 1/133504* (2013.01); *G02B 27/0172* (2013.01)

(58) Field of Classification Search
CPC .. G02F 2201/305; G02F 1/1326; G02F 1/011; G02F 1/2955
See application file for complete search history.

(56) References Cited

U.S. PATENT DOCUMENTS

2016/0231568 A1  8/2016  Saarikko et al.
2018/0164627 A1* 6/2018  Oh ...................... G02F 1/13718
(Continued)

FOREIGN PATENT DOCUMENTS

CN  111045255 A *  4/2020  ....... G02F 1/133512
JP  2002-31788 A     1/2002
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2021/011127, dated Oct. 13, 2022, with an English translation.
(Continued)

*Primary Examiner* — Paul C Lee
(74) *Attorney, Agent, or Firm* — Birch, Stewart, Kolasch & Birch, LLP

(57) ABSTRACT

A light guide element includes: a light guide plate; and a diffraction element that is disposed on a main surface of the light guide plate, in which the diffraction element includes a liquid crystal layer that is formed of a liquid crystal composition including a liquid crystal compound and has a liquid crystal alignment pattern in which a direction of an optical axis derived from the liquid crystal compound changes while continuously rotating in at least one in-plane direction, a refractive index of the light guide plate is 1.70 or higher, and in a case where the refractive index of the light
(Continued)

guide plate is represented by $n_d$ and a refractive index of the liquid crystal layer is represented by $n_k$, $n_k - n_d \geq 0$ is satisfied.

5 Claims, 11 Drawing Sheets

(56) References Cited

U.S. PATENT DOCUMENTS

| | | | |
|---|---|---|---|
| 2018/0239177 A1* | 8/2018 | Oh | G02B 26/0825 |
| 2018/0275350 A1* | 9/2018 | Oh | G02B 27/0093 |
| 2021/0026049 A1 | 1/2021 | Saitoh et al. | |
| 2021/0149256 A1 | 5/2021 | Sato et al. | |
| 2021/0181513 A1 | 6/2021 | Yanai | |
| 2023/0080496 A1 | 3/2023 | Kogure | |

FOREIGN PATENT DOCUMENTS

| | | | | |
|---|---|---|---|---|
| JP | 2012027334 A | * | 2/2012 | G02B 6/0068 |
| JP | 2015-105990 A | | 6/2015 | |
| JP | 2019-20723 A | | 2/2019 | |
| JP | 2020-501186 A | | 1/2020 | |
| WO | WO 2016/162606 A1 | | 10/2016 | |
| WO | WO 2019/189586 A1 | | 10/2019 | |
| WO | WO 2020/022504 A1 | | 1/2020 | |
| WO | WO 2020/045626 A1 | | 3/2020 | |

OTHER PUBLICATIONS

International Search Report (Form PCT/ISA/210) for International Application No. PCT/JP2021/011127, dated May 25, 2021, with an English translation.

Japanese Office Action for corresponding Japanese Application No. 2022-511892, dated Apr. 4, 2023, with English translation.

Japanese Notice of Reasons for Refusal for corresponding Japanese Application No. 2022-511892, dated Aug. 22, 2023, with an English translation.

Japanese Notice of Reasons for Refusal for corresponding Japanese Application No. 2022-511892, dated Nov. 7, 2023, with English translation.

* cited by examiner

LIGHT GUIDE ELEMENT COMPRISING A DIFFRACTION ELEMENT HAVING A CHOLESTERIC LIQUID CRYSTAL LAYER WITH A PITCH GRADIENT

CROSS-REFERENCE TO RELATED APPLICATIONS

This application is a Continuation of PCT International Application No. PCT/JP2021/011127 filed on Mar. 18, 2021, which claims priority under 35 U.S.C. § 119(a) to Japanese Patent Application No. 2020-065845 filed on Apr. 1, 2020. Each of the above application(s) is hereby expressly incorporated by reference, in its entirety, into the present application.

BACKGROUND OF THE INVENTION

1. Field of the Invention

The present invention relates to a light guide element that propagates light.

2. Description of the Related Art

Recently, as described in US2016/0231568A1, augmented reality (AR) glasses that display a virtual image and various information or the like to be superimposed on a scene that is actually being seen have been put into practice. The AR glasses are also called, for example, smart glasses or a head-mounted display (HMD).

As described in US2016/0231568A1, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is guided using a light guide element where a diffraction element is disposed on a surface of a light guide plate. Specifically, light (projection light) projected from a display is diffracted (refracted) using the diffraction element to be incident into one end part of the light guide plate. As a result, the light is introduced into the light guide plate at an angle such that the light is totally reflected and propagates in the light guide plate. The light propagated in the light guide plate is also diffracted by an emission diffraction element in the other end part of the light guide plate and is emitted from the light guide plate to an observation position by the user.

For AR glasses including this light guide element, it is required that a field of view (FOV) that is a region where an image is displayed is wide.

To that end, it is considered to widen the FOV by increasing the refractive index of the light guide plate and increasing a difference in refractive index from air to increase a condition (angle) where light is totally reflected in the light guide plate.

Incidentally, as the diffraction element in the light guide element, there is disclosed a liquid crystal diffraction element including a liquid crystal layer where a liquid crystal compound is aligned in an alignment pattern in which a direction of an optical axis changes while continuously rotating in one in-plane direction (WO2020/022504A).

This liquid crystal diffraction element has a higher diffraction efficiency than a diffraction element or the like having a surface relief structure.

SUMMARY OF THE INVENTION

According to an investigation by the present inventors, it was found that, in a light guide element including the liquid crystal diffraction element, an incidence angle at which a high diffraction efficiency cannot be obtained by increasing the refractive index of the light guide plate is present.

Typically, in the liquid crystal diffraction element, a diffraction efficiency at a given incidence angle can be controlled by controlling a single period Λ of the alignment pattern in which the direction of the optical axis changes while continuously rotating in the one in-plane direction, a thickness d, and a helical pitch P in a case where the liquid crystal layer is cholesterically aligned.

However, it was found that, in a case where the refractive index of the light guide plate is high, an incidence angle at which the diffraction efficiency cannot be increased simply by controlling the single period Λ, the thickness d, and the helical pitch P is present.

An object of the present invention is to solve the problems in the related art and to provide a light guide element where an incidence angle range at which a high diffraction efficiency can be obtained is wide.

In order to achieve the object, the present invention has the following configurations.

[1] A light guide element comprising:
a light guide plate; and
a diffraction element that is disposed on a main surface of the light guide plate,
in which the diffraction element includes a liquid crystal layer that is formed of a liquid crystal composition including a liquid crystal compound and has a liquid crystal alignment pattern in which a direction of an optical axis derived from the liquid crystal compound changes while continuously rotating in at least one in-plane direction,
a refractive index of the light guide plate is 1.70 or higher, and
in a case where the refractive index of the light guide plate is represented by $n_d$ and a refractive index of the liquid crystal layer is represented by $n_k$,
$n_k - n_d \geq 0$ is satisfied.
[2] The light guide element according to [1]
in which the liquid crystal layer is a cholesteric liquid crystal layer obtained by immobilizing a cholesteric liquid crystalline phase.
[3] The light guide element according to [1] or [2],
in which the cholesteric liquid crystal layer is a pitch gradient layer in which a helical pitch changes in a thickness direction.
[4] The light guide element according to [3],
in which in a main surface of the liquid crystal layer in which the direction of the optical axis of the liquid crystal compound changes while continuously rotating in at least one in-plane direction, in a case where a length over which the direction of the optical axis of the liquid crystal compound rotates by 180° is set as a single period Λ, a helical pitch on one surface side of the pitch gradient layer is represented by P1, and a helical pitch on the other surface side of the pitch gradient layer is represented by P2,
P1<Λ<P2 is satisfied.
[5] The light guide element according to any one of [1] to [4],
in which the refractive index $n_d$ of the light guide plate and the refractive index $n_k$ of the liquid crystal layer satisfy $0.1 > n_k - n_d \geq 0$.

[6] The light guide element according to any one of [1] to [5], in which the diffraction element is an incidence diffraction element that causes light to be incident into the light guide plate.

According to an aspect of the present invention, it is possible to provide a light guide element where an incidence angle range at which a high diffraction efficiency can be obtained is wide.

DESCRIPTION OF THE PREFERRED EMBODIMENTS

Hereinafter, a light guide element according to an embodiment of the present invention will be described in detail based on preferable embodiments shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, a refractive index refers to a refractive index at a wavelength of 550 nm.

Light Guide Element

The light guide element according to the embodiment of the present invention comprises:

a light guide plate; and a diffraction element that is disposed on a main surface of the light guide plate, in which the diffraction element includes a liquid crystal layer that is formed of a liquid crystal composition including a liquid crystal compound and has a liquid crystal alignment pattern in which a direction of an optical axis derived from the liquid crystal compound changes while continuously rotating in at least one in-plane direction, a refractive index of the light guide plate is 1.70 or higher, and in a case where the refractive index of the light guide plate is represented by $n_d$ and a refractive index of the liquid crystal layer is represented by $n_k$, $n_k - n_d \geq 0$ is satisfied.

Figure 1:
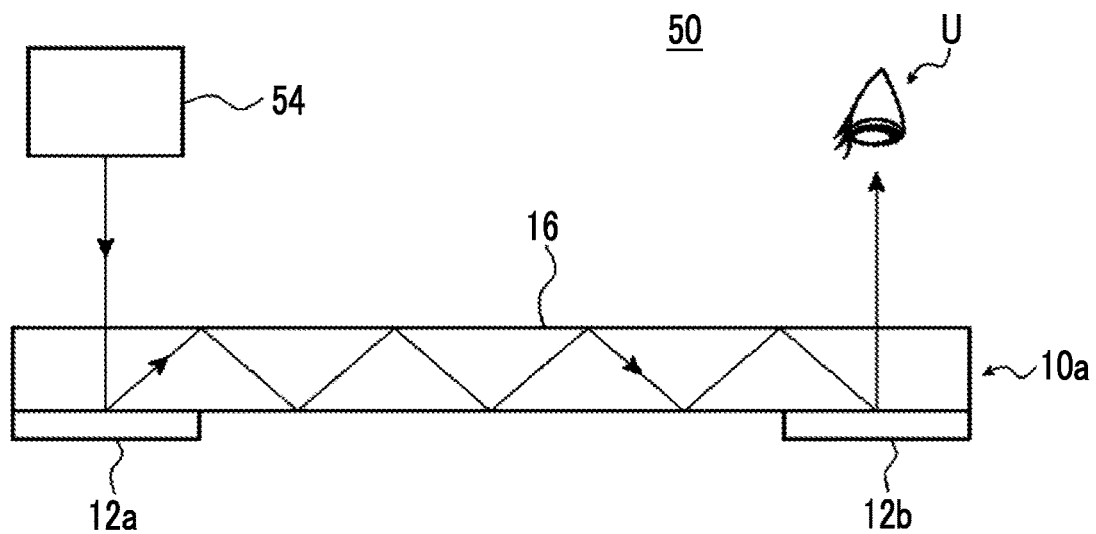
FIG. 1 is a diagram conceptually showing an example of an image display apparatus including a light guide element according to the present invention.

FIG. 1 is a diagram conceptually showing an example of an image display apparatus including a light guide element according to the embodiment of the present invention.

An image display apparatus 50 shown in FIG. 1 is used as AR glasses as a preferable example. The light guide element according to the embodiment of the present invention can also be used not only as AR glasses but also as an optical element such as a transparent screen, a lighting device (including a backlight or the like of a liquid crystal display), or a sensor. In addition, the image display apparatus according to the embodiment of the present invention can also be used as an image display apparatus including the optical element.

The image display apparatus 50 shown in FIG. 1 includes: a display element 54; and a light guide element 10a including a light guide plate 16 and diffraction elements 12a and 12b that are disposed on a main surface of the light guide plate 16.

In the light guide element 10a shown in FIG. 1, the diffraction element 12a and the diffraction element 12b are disposed at different positions in a plane direction of the main surface of the light guide plate 16. In the example shown in FIG. 1, the diffraction element 12a is disposed at an end part of the light guide plate 16 on the left side in the drawing. In addition, the diffraction element 12b is disposed at an end part of the light guide plate 16 on the right side in the drawing. The main surface is the maximum surface of a sheet-shaped material (a plate-shaped material, a film, or the like).

In addition, in the image display apparatus 50, the display element 54 is disposed at a position overlapping the diffraction element 12a in the plane direction of the main surface of the light guide plate 16 to face the surface of the light guide plate 16 opposite to the side where the diffraction element 12a is disposed.

In the example shown in FIG. 1, the diffraction element 12a and the diffraction element 12b are reflective diffraction elements that reflect light in a direction different from specular reflection to reflect and diffract the light. The diffraction element 12a and the diffraction element 12b include a liquid crystal layer that is formed of a liquid crystal composition including a liquid crystal compound and has a liquid crystal alignment pattern in which a direction of an optical axis derived from the liquid crystal compound changes while continuously rotating in at least one in-plane direction. As a result, the light is diffracted. This point will be described below.

In the image display apparatus 50, an image (light corresponding to the image) displayed by the display element 54 is incident into the diffraction element 12a from a direction perpendicular to the main surface of the light guide plate 16. The light incident into the diffraction element 12a is diffracted by the diffraction element 12a to be incident into the light guide plate 16. In this case, the diffraction element 12a diffracts the light at an angle at which total reflection occurs in the light guide plate 16, and diffracts the light such that a traveling direction of the diffracted light is a direction toward the diffraction element 12b. In the example shown in FIG. 1, the diffraction element 12a diffracts the incident light to the right direction in FIG. 1.

The light diffracted by the diffraction element 12a is totally reflected in the light guide plate 16 and propagates to another end part side to be incident into the diffraction element 12b. The diffraction element 12b diffracts the incident light to deviate from the angle at which total reflection occurs in the light guide plate 16. In the example shown in FIG. 1, the diffraction element 12b diffracts the incident light to the upper side in FIG. 1. That is, as shown in FIG. 1, the diffraction element 12b diffracts the incident light in a direction substantially perpendicular to the main surface of the light guide plate.

The light diffracted by the diffraction element 12b is emitted from the light guide plate 16 to the user U. As a result, the image display apparatus 50 can display the image emitted from the display element 54.

Here, in the present invention, the refractive index of the light guide plate 16 is 1.70 or higher.

Figure 2:
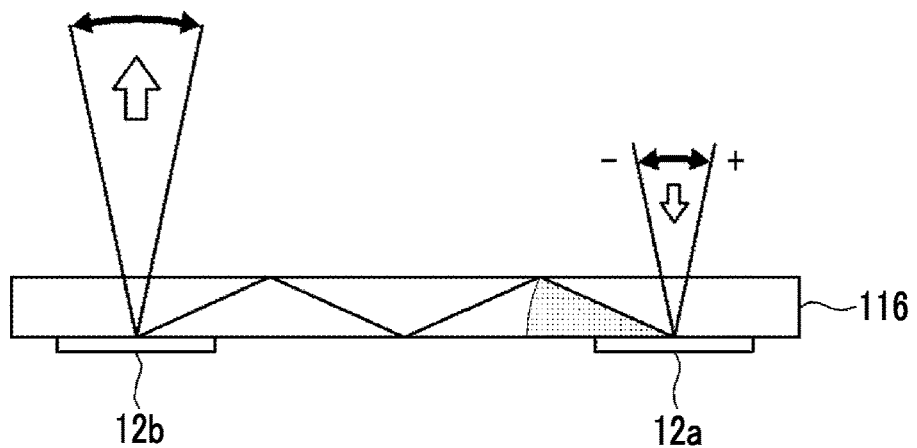
FIG. 2 is a diagram showing a relationship between a refractive index of a light guide plate, an incidence angle range, and a FOV.
Figure 3:
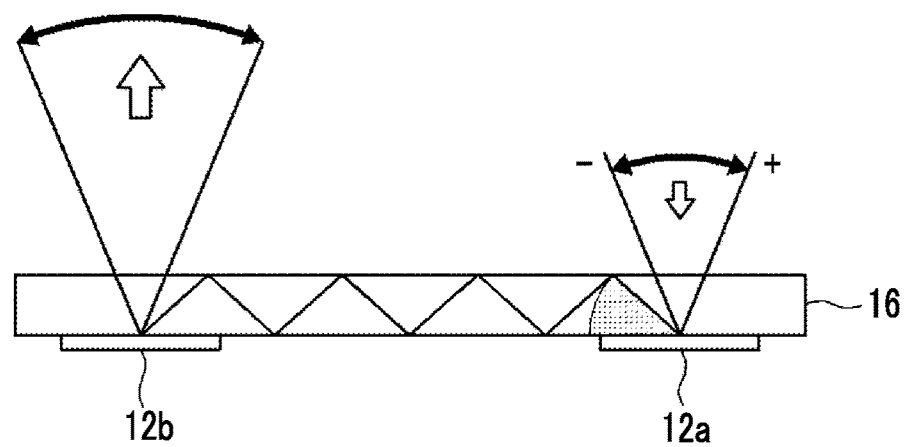
FIG. 3 is a diagram showing a relationship between a refractive index of a light guide plate, an incidence angle range, and a FOV.

A relationship between the refractive index of the light guide plate 16 and the incidence angle of light incident into the light guide plate will be described using FIGS. 2 and 3. The light guide element shown in FIG. 2 is an example where the refractive index of a light guide plate 52b is low. The light guide element shown in FIG. 3 is an example where the refractive index of a light guide plate 52 is high.

As is well-known, an angle at which light is totally reflected in the light guide plate depends on a difference between the refractive index of the light guide plate and the refractive index of air. As the refractive index of the light guide plate decreases, the difference in refractive index from air decreases. As in the example shown in FIG. 2, an angle range where light is totally reflected in the light guide plate 52b is narrowed. Here, for example, the diffraction element 12a on the incidence side diffracts light incident from the direction perpendicular to the main surface of the light guide plate 52b such that the light travels at an angle of the center of the total reflection angle range. Assuming that a range of an angle of incidence light at which the diffraction element 12a can diffract the incident angle in the total reflection angle range is an incidence angle range, in a case where the refractive index of the light guide plate 52b is low, the total reflection angle is narrow, and thus this incidence angle range is also narrow. In addition, as shown in FIG. 2, in a case where the total reflection angle range is narrow, an angle range of light emitted from the diffraction element 12b on the emission side is also narrowed, and the field of view (FOV) that is a region where an image is displayed is narrowed.

On the other hand, in a case where the refractive index of the light guide plate is high, a difference in refractive index from air increases. Therefore, as in the example shown in FIG. 3, an angle range where light is totally reflected in the light guide plate 52 is widened. Therefore, in a case where the refractive index of the light guide plate 52 is high, the total reflection angle range is wide. Therefore, the incidence angle range where the diffraction element 12a can diffract incident angle in the total reflection angle range is also widened. In addition, as shown in FIG. 3, in a case where the total reflection angle range is wide, an angle range of light emitted from the diffraction element 12b on the emission side is also widened, and the field of view (FOV) that is a region where an image is displayed is widened.

Here, further, in the present invention, in a case where the refractive index of the light guide plate is represented by $n_d$ and the refractive index of the liquid crystal layer in the diffraction element is represented by $n_k$, $n_k - n_d \geq 0$ is satisfied. That is, the refractive index of the liquid crystal layer (diffraction element) is higher than or equal to the refractive index of the light guide plate.

According to an investigation by the present inventors, it was found that, in the light guide element including the liquid crystal layer (hereinafter, also referred to as the liquid crystal diffraction element), an incidence angle at which a high diffraction efficiency cannot be obtained by increasing the refractive index of the light guide plate (in a case where the refractive index is 1.70 or higher) is present. The present inventors conducted various investigations on this point and found that, in a case where the refractive index of the liquid crystal layer of the diffraction element (hereinafter, also referred to as the refractive index of the diffraction element) is lower than the refractive index of the light guide plate, the diffraction efficiency decreases in a part of the incidence angle range.

Figure 4:
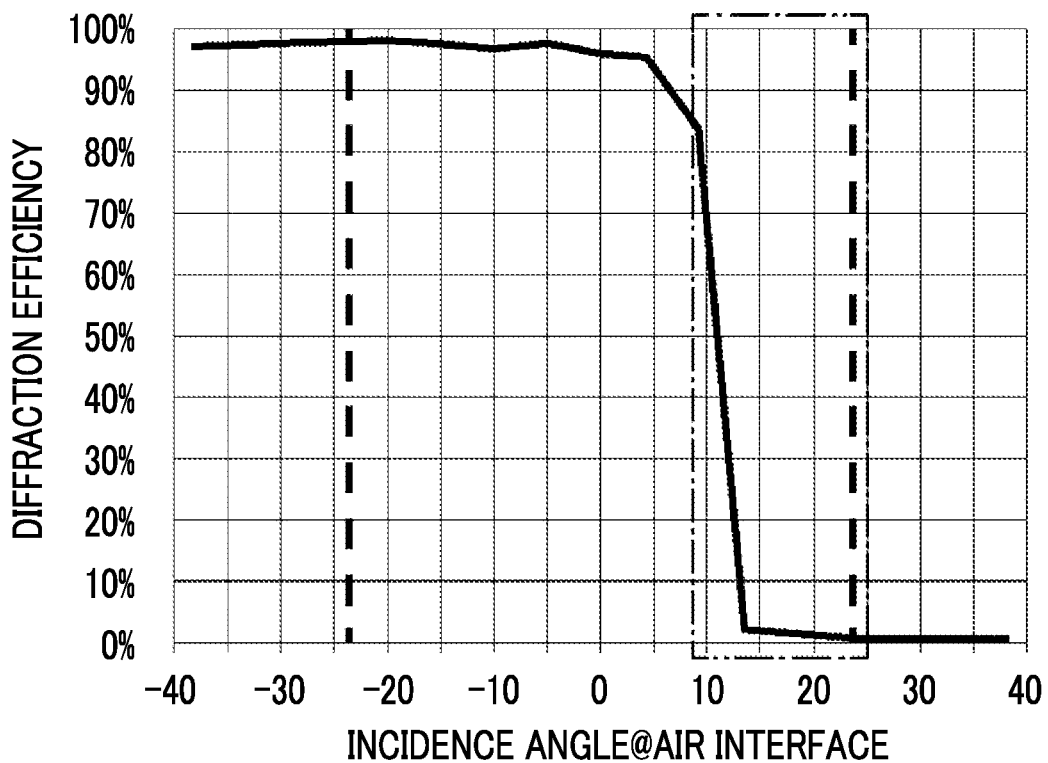
FIG. 4 is a graph showing a relationship between an incidence angle and a diffraction efficiency.

For example, FIG. 4 is a graph showing a relationship between the incidence angle range and the diffraction efficiency in a case where the refractive index of the diffraction element is lower than the refractive index of the light guide plate. This graph is an example where the refractive index of the light guide plate is 1.80 and the refractive index of the diffraction element is 1.60.

In the example shown in FIG. 4, an incidence angle range where incidence light can be refracted in a total reflection angle range determined from the refractive index of the light guide plate is about −24° to 24° (indicated by a broken line in FIG. 4). An incidence angle that is tilted in a direction in which light travels in the light guide plate is negative, and an incidence angle that is tilted in a direction opposite to the direction in which light travels in the light guide plate is positive (refer to FIGS. 2 and 3).

However, it was found that, in a case where the refractive index of the diffraction element is lower than the refractive index of the light guide plate, the diffraction efficiency is substantially 0% in an angle range (about 10° to 24°) indicated by a chain line in FIG. 4.

On the other hand, the present inventors conducted various investigations and thus found that, by adjusting the refractive index of the diffraction element to be higher than or equal to the refractive index of the light guide plate, a decrease in the diffraction efficiency in a part of the incidence angle range can be suppressed.

Figure 5:
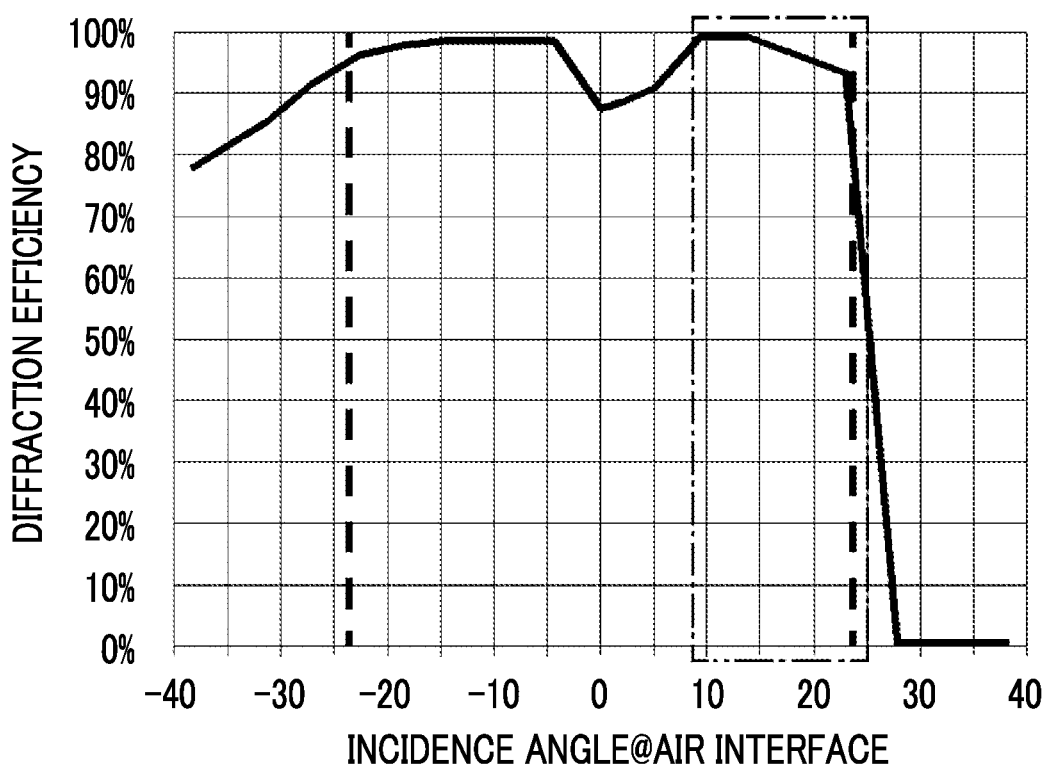
FIG. 5 is a graph showing a relationship between an incidence angle and a diffraction efficiency.

For example, FIG. 5 is a graph showing a relationship between the incidence angle range and the diffraction efficiency in a case where the refractive index of the diffraction element is higher than or equal to the refractive index of the light guide plate. This graph is an example where the refractive index of the light guide plate is 1.80 and the refractive index of the diffraction element is 1.80.

In the example shown in FIG. 5, an incidence angle range where incidence light can be refracted in a total reflection angle range determined from the refractive index of the light guide plate is about −24° to 24° (indicated by a broken line in FIG. 5) as in the example of FIG. 4.

It was found that, in a case where the refractive index of the diffraction element is higher than or equal to the refractive index of the light guide plate as shown in FIG. 5, a high diffraction efficiency can be obtained in an angle range (about 10° to 24°, the range indicated by the chain line in FIG. 5) where the diffraction efficiency is substantially 0% in a case where the refractive index of the diffraction element is lower than the refractive index of the light guide plate.

As described above, typically, in the liquid crystal diffraction element, a diffraction efficiency at a given incidence angle can be controlled by controlling a single period Λ of an alignment pattern in which a direction of an optical axis changes while continuously rotating in one in-plane direction, a thickness d, and a helical pitch P in a case where the liquid crystal layer is cholesterically aligned. However, it was found that, in a case where the refractive index of the light guide plate is high, an incidence angle at which the diffraction efficiency cannot be increased simply by controlling the single period Λ, the thickness d, and the helical pitch P is present.

On the other hand, in the light guide element according to the embodiment of the present invention, in a case where the refractive index of the light guide plate is represented by $n_d$ and the refractive index of the diffraction element is represented by $n_k$, by satisfying $n_k - n_d \geq 0$, the incidence angle range at which a high diffraction efficiency can be obtained can be widened.

Here, from the viewpoint of diffraction efficiency, it is preferable that the refractive index $n_d$ of the light guide plate and the refractive index $n_k$ of the diffraction element satisfy $0.1 > n_k - n_d \geq 0$, and it is more preferable that the refractive index $n_d$ of the light guide plate and the refractive index $n_k$ of the diffraction element satisfy $0.05 > n_k - n_d \geq 0$.

In addition, from the viewpoints of the field of view (FOV), the diffraction efficiency, and the like, the refractive index of the light guide plate is preferably 1.7 to 2.3 and more preferably 1.9 to 2.3.

Here, in the example shown in FIG. 1, the light guide element 10a includes the reflective diffraction element 12a and the diffraction element 12b. However, the present invention is not limited to this configuration.

Figure 6:
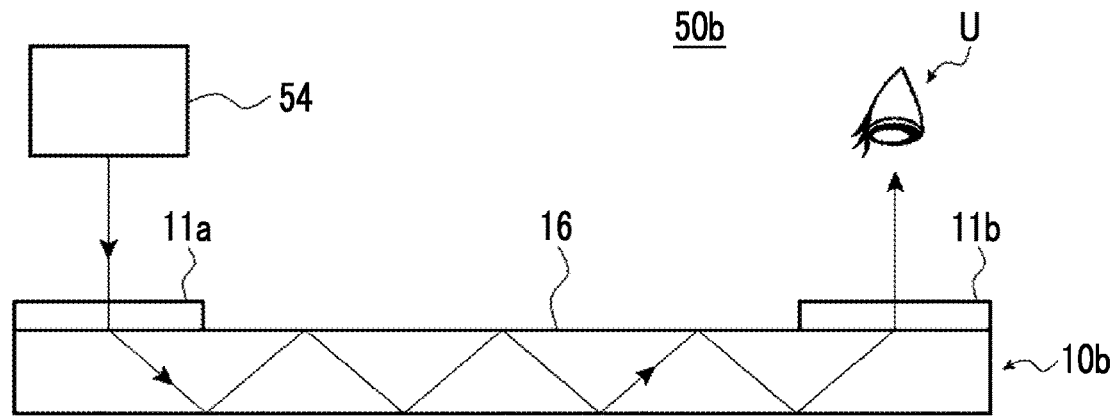
FIG. 6 is a diagram conceptually showing another example of the image display apparatus including the light guide element according to the present invention.

FIG. 6 is a diagram conceptually showing another example of the image display apparatus including the light guide element according to the present invention.

An image display apparatus 50b shown in FIG. 6 includes: the display element 54; and a light guide element 10b including the light guide plate 16 and diffraction elements 11a and 11b that are disposed on a main surface of the light guide plate 16.

In the light guide element 10b shown in FIG. 6, the diffraction element 11a and the diffraction element 11b are disposed at different positions in a plane direction of the main surface of the light guide plate 16. In the example shown in FIG. 6, the diffraction element 11a is disposed at an end part of the light guide plate 16 on the left side in the drawing. In addition, the diffraction element 11b is disposed at an end part of the light guide plate 16 on the right side in the drawing.

In addition, in the image display apparatus 50b, the display element 54 is disposed at a position overlapping the diffraction element 11a in the plane direction of the main surface of the light guide plate 16 to face the surface of the light guide plate 16 on the side where the diffraction element 11a is disposed.

In the example shown in FIG. 6, the diffraction element 11a and the diffraction element 11b are transmissive diffraction elements that diffract light while allowing transmission of the light. The diffraction element 11a and the diffraction element 11b include a liquid crystal layer that is formed of a liquid crystal composition including a liquid crystal compound and has a liquid crystal alignment pattern in which a direction of an optical axis derived from the liquid crystal compound changes while continuously rotating in at least one in-plane direction. As a result, the light is diffracted. This point will be described below.

In the image display apparatus 50b, an image (light corresponding to the image) displayed by the display element 54 is incident into the diffraction element 11a from a direction perpendicular to the main surface of the light guide plate 16. The light incident into the diffraction element 11a is diffracted by the diffraction element 11a to be incident into the light guide plate 16. In this case, the diffraction element 11a diffracts the light at an angle at which total reflection occurs in the light guide plate 16, and diffracts the light such that a traveling direction of the diffracted light is a direction toward the diffraction element 11b. In the example shown in FIG. 6, the diffraction element 11a diffracts the incident light to the right direction in FIG. 6.

The light diffracted by the diffraction element 11a is totally reflected in the light guide plate 16 and propagates to another end part side to be incident into the diffraction element 11b. The diffraction element 11b diffracts the incident light to deviate from the angle at which total reflection occurs in the light guide plate 16. In the example shown in FIG. 6, the diffraction element 11b diffracts the incident light to the upper side in FIG. 6. That is, as shown in FIG. 6, the diffraction element 11b diffracts the incident light in a direction substantially perpendicular to the main surface of the light guide plate.

The light diffracted by the diffraction element 11b is emitted from the light guide plate 16 to the user U. As a result, the image display apparatus 50 can display the image emitted from the display element 54.

This way, in the light guide element including the transmissive diffraction element, by adjusting the refractive index of the light guide plate 16 to be 1.70 or higher, the total reflection angle range can be widened, and the field of view (FOV) can be widened. In addition, by adjusting the refractive index of the diffraction element to be higher than or equal to the refractive index of the light guide plate, the incidence angle range at which a high diffraction efficiency can be obtained can be widened.

In the above description, the relationship between the difference in refractive index between the diffraction element and the light guide plate and, the incidence angle range, and the diffraction efficiency is described. That is, in a case where the refractive index of the diffraction element on the incidence side is higher than or equal to the refractive index of the light guide plate, the above-described effect can be obtained. However, the present invention is not limited to this configuration. The refractive index of the diffraction element on the emission side may be higher than or equal to the refractive index of the light guide plate. By adjusting the refractive index of the diffraction element on the emission side to be higher than or equal to the refractive index of the light guide plate, in the diffraction element on the emission side, an angle range where a high diffraction efficiency can be obtained can be widened, and the field of view (FOV) can be widened.

Hereinafter, each of the components will be described.

Display Element

The display element 54 displays an image (video) to be observed by the user U and emits the image to the incidence diffraction element. Accordingly, the display elements 54 are disposed such that the emitted image is incident into the incidence diffraction element.

In the image display apparatus, as the display element 54, various well-known display elements (a display device or a projector) used for AR glasses or the like can be used without any particular limitation. Examples of the display element 54 include a display element including a display and a projection lens.

In the image display apparatus, the display is not particularly limited. For example, various well-known displays used in AR glasses or the like can be used.

Examples of the display include a liquid crystal display (including Liquid Crystal On Silicon (LCOS)), an organic electroluminescent display, and a scanning type display employing a digital light processing (DLP) or Micro Electro Mechanical Systems (MEMS) mirror.

In a case where the image display apparatus displays a polychromic image, a display that displays a polychromic image is used.

In the display element 54 used in the image display apparatus, the projection lens is also a well-known projection lens (collimating lens) used for AR glasses or the like.

Here, in the image display apparatus, a display image by the display element 54, that is, light to be emitted from the display element 54 is not limited and is preferably unpolarized light (natural light) or circularly polarized light.

In a case where the display element 54 emits circularly polarized light and the display emits an unpolarized light image, and it is preferable that the display element 54 includes, for example, a circularly polarizing plate consisting of a linear polarizer and a λ/4 plate. In addition, in a case where the display emits a linearly polarized light image, it is preferable that the display element 54 includes, for example, a λ/4 plate.

The light to be emitted by the display element 54 may be another polarized light (for example, linearly polarized light).

Light Guide Plate

In the light guide element 10a, the light guide plate 16 is a well-known light guide plate that reflects light incident thereinto and guides (propagates) the reflected light except that the refractive index is 1.70 or higher.

As the light guide plate 16, various well-known light guide plates used for a backlight unit or the like of AR glasses or a liquid crystal display can be used without any particular limitation.

Examples of a material of the light guide plate 16 having a refractive index of 1.70 or higher include dense flint glass, glass including Ba, La, or Nb, and a polymer-based light guide plate.

The upper limit of the refractive index of the light guide plate 16 is not particularly limited and is 2.1 or lower in many cases.

Diffraction Element

Examples of the diffraction element on the incidence side and the diffraction element on the emission side include a liquid crystal diffraction element that is formed using a composition including a liquid crystal compound and has a liquid crystal layer with a liquid crystal alignment pattern in which a direction of an optical axis derived from the liquid crystal compound changes while continuously rotating in at least one in-plane direction. In addition, it is also preferable that the liquid crystal diffraction element includes a cholesteric liquid crystal layer obtained by immobilizing a cholesteric liquid crystalline phase.

Reflective Liquid Crystal Diffraction Element

An example of the liquid crystal diffraction element will be described using FIGS. 7 to 9.

Figure 7:
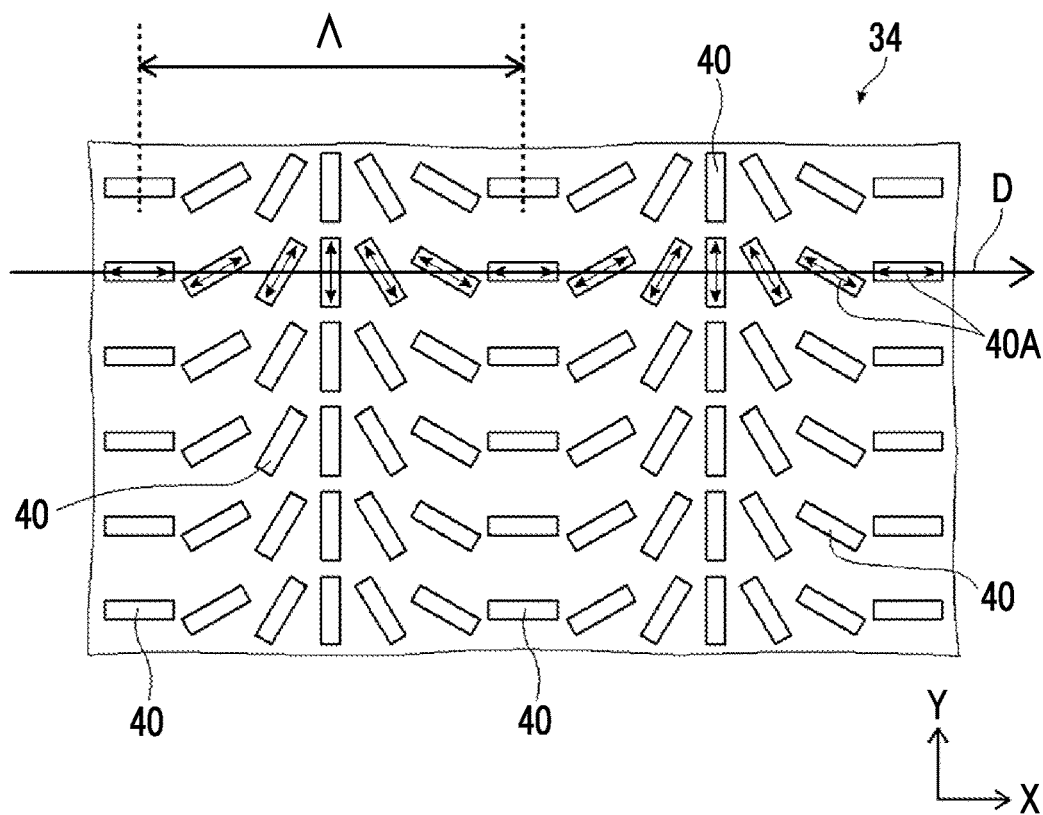
FIG. 7 is a plan view conceptually showing a cholesteric liquid crystal layer used as a diffraction element.

FIG. 7 is a schematic diagram showing an alignment state of a liquid crystal compound in a plane of a main surface of a liquid crystal layer 34 including the liquid crystal diffraction element 12. In addition, FIG. 8 is a schematic cross-sectional view showing a state of a liquid crystal phase in a cross-section perpendicular to the main surface. In the following description, it is assumed that a main surface of the liquid crystal layer 34 is an X-Y plane and a cross-section perpendicular to the X-Y plane is an X-Z plane. That is, FIG. 7 corresponds to a schematic diagram of the X-Y plane of the liquid crystal layer 34, and FIG. 8 corresponds to a schematic diagram of the X-Z plane of the liquid crystal layer 34.

Figure 8:
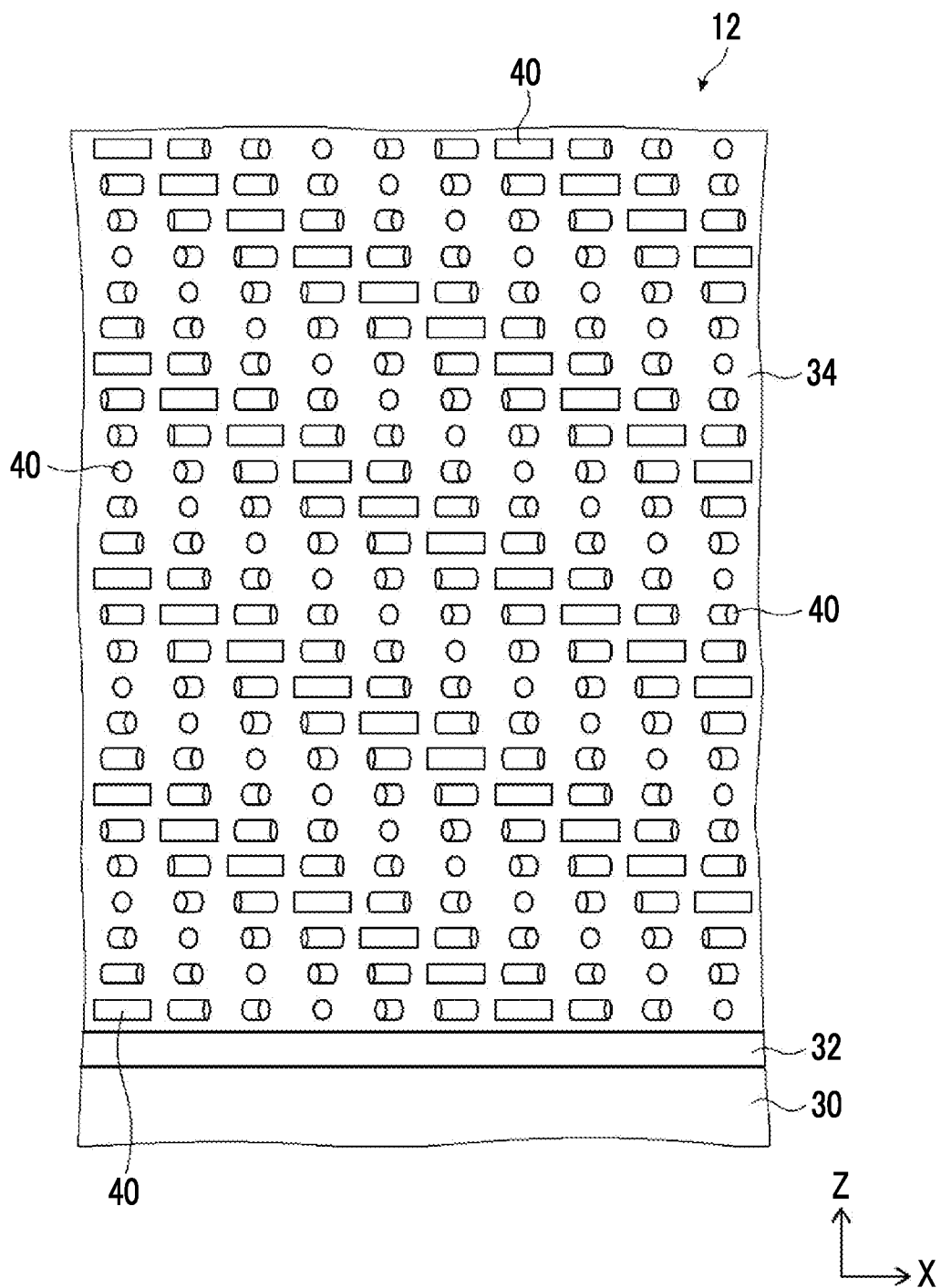
FIG. 8 is a conceptual diagram showing the cholesteric liquid crystal layer shown in FIG. 7.

The liquid crystal layer shown in FIGS. 7 and 8 is an example of a cholesteric liquid crystal layer obtained by cholesteric alignment of a liquid crystal compound. In addition, the liquid crystal compound is an example of a rod-like liquid crystal compound. The cholesteric liquid crystal layer reflects one circularly polarized light having a selective reflection wavelength, and allows transmission of light in other wavelength ranges and other circularly polarized light. Accordingly, the liquid crystal diffraction element including the cholesteric liquid crystal layer is a reflective liquid crystal diffraction element.

In the example shown in FIG. 8, the liquid crystal diffraction element 12 includes the support 30, the alignment film 32, and the liquid crystal layer 34.

In the example shown in FIG. 8, the liquid crystal diffraction element 12 includes the support 30, the alignment film 32, and the liquid crystal layer 34. However, the present invention is not limited to this configuration. The liquid crystal diffraction element 12 may include only the alignment film 32 and the liquid crystal layer 34 by peeling off the support 30 after bonding the laminate to the light guide plate 16. Alternatively, the liquid crystal diffraction element may include only the liquid crystal layer 34 by peeling off the support 30 and the alignment film 32 after bonding the laminate to the light guide plate 16.

Support

The support 30 supports the alignment film 32 and the liquid crystal layer 34.

As the support 30, various sheet-shaped materials (films or plate-shaped materials) can be used as long as they can support the alignment film 32 and the liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the liquid crystal diffraction element, a material for forming the support 30, and the like in a range where the alignment film 32 and the liquid crystal layer 34 can be supported.

The thickness of the support 30 is preferably 1 to 2000 µm, more preferably 3 to 500 µm, and still more preferably 5 to 250 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

Alignment Film

In the liquid crystal diffraction element 12, the alignment film 32 is formed on a surface of the support 30.

The alignment film 32 is an alignment film for aligning the liquid crystal compound 40 to a predetermined liquid crystal alignment pattern during the formation of the liquid crystal layer 34.

Although described below, the liquid crystal layer 34 has a liquid crystal alignment pattern in which a direction of an optical axis 40A (refer to FIG. 7) derived from the liquid crystal compound 40 changes while continuously rotating in one in-plane direction. Accordingly, the alignment film 32 is formed such that the liquid crystal layer 34 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the liquid crystal diffraction element 12, the alignment film 32 can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 µm and more preferably 0.05 to 2 µm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 13:
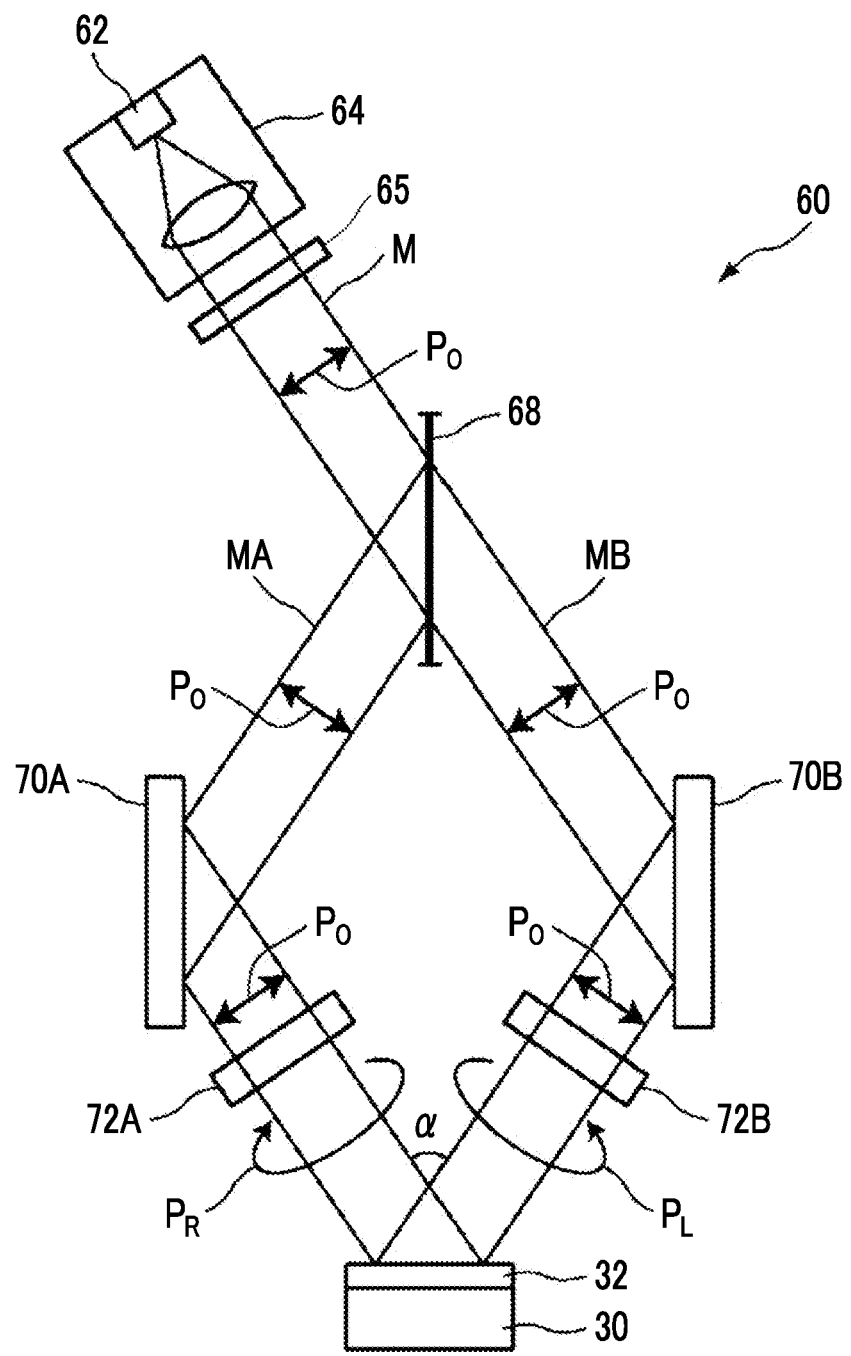
FIG. 13 is a conceptual diagram showing an example of an exposure device that exposes an alignment film.

FIG. 13 conceptually shows an example of an exposure device that exposes the alignment film 32 to form an alignment pattern.

An exposure device 60 shown in FIG. 13 includes: a light source 64 including a laser 62; a λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_O$. The λ/4 plate 72A converts the linearly polarized light $P_O$ (beam MA) into right circularly polarized light $P_R$, and the λ/4 plate 72B converts the linearly polarized light $P_O$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the liquid crystal layer 34 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has a liquid crystal alignment pattern in which the liquid crystal compound is aligned such that the direction of the optical axis of the liquid crystal compound in the liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

The alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, the liquid crystal layer has the liquid crystal alignment pattern in which the direction of the optical axis 40A derived from the liquid crystal compound 40 changes while continuously rotating in at least one in-plane direction. That is, the support 30 may action as the alignment film.

Liquid Crystal Layer

In the liquid crystal diffraction element 12, the liquid crystal layer 34 is formed on a surface of the alignment film 32.

As described above, the liquid crystal layer 34 is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 8, the liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch, and plural pitches of the helically turned liquid crystal compound 40 are laminated.

As is well-known, the cholesteric liquid crystal layer obtained by immobilizing a cholesteric liquid crystalline phase has wavelength-selective reflectivity.

Although described below in detail, the selective reflection wavelength range of the cholesteric liquid crystal layer depends on the length (pitch P shown in FIG. 9) of one helical pitch described above.

Accordingly, the diffraction element including the liquid crystal layer has wavelength selectivity and diffracts light having a predetermined wavelength. Accordingly, regarding the wavelength of light that is reflected (diffracted) by the diffraction element, the selective reflection wavelength range of the liquid crystal layer may be appropriately set by adjusting the helical pitch P of the liquid crystal layer.

As shown in FIG. 7, in the X-Y plane of the liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 7, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 7, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the liquid crystal layer 34, the single period Λ is repeated in the arrangement axis D direction, that is, in the one in-plane direction in which the direction of the optical axis 40A changes while continuously rotating.

On the other hand, in the liquid crystal compound 40 forming the liquid crystal layer 34, the directions of the optical axes 40A are the same in the direction (in FIG. 7, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the arrangement axis D direction are the same in the Y direction.

Figure 9:
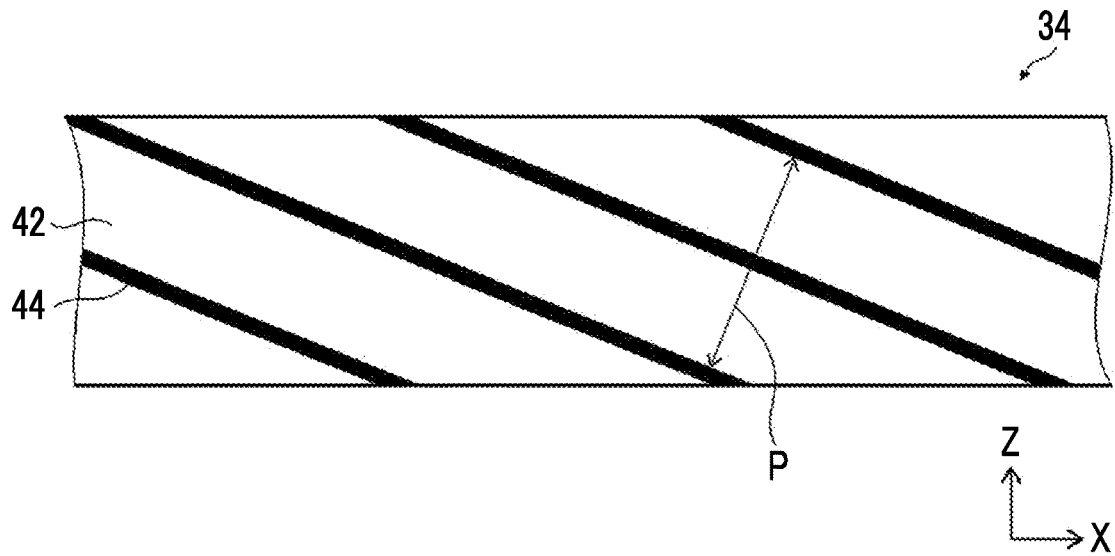
FIG. 9 is a diagram conceptually showing a cross-sectional SEM image of the cholesteric liquid crystal layer shown in FIG. 7.
Figure 11:
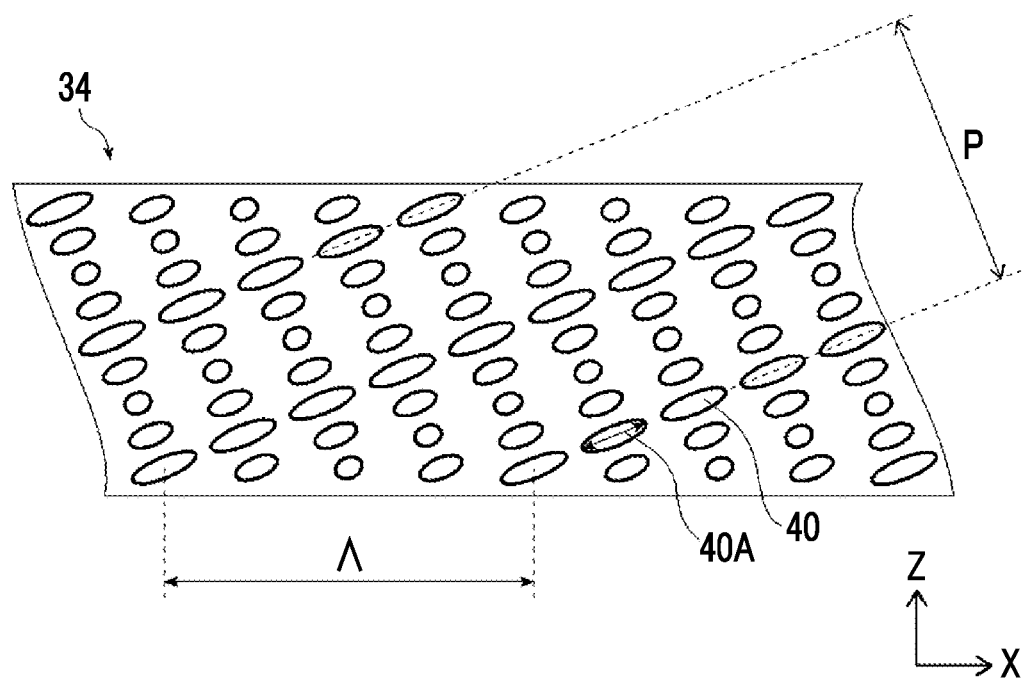
FIG. 11 is a diagram conceptually showing another example of the cholesteric liquid crystal layer used as a diffraction element.

In a case where the X-Z plane of the liquid crystal layer 34 shown in FIG. 8 is observed with a scanning electron microscope (SEM), an arrangement direction in which bright portions 42 and dark portions 44 are alternately arranged as shown in FIG. 9, a stripe pattern tilted at a predetermined angle with respect to the main surface (X-Y plane) is observed. In this SEM cross-section, an interval between the bright portions 42 adjacent to each other or between the dark portions 44 adjacent to each other in a normal direction of lines formed by the bright portions 42 or the dark portions 44 substantially matches a ½ pitch. That is, as indicated by P in FIG. 9, two bright portions 42 and two dark portions 44 substantially match one helical pitch (one helical turn), that is, the pitch P. In a case where the tilt of the liquid crystal compound matches with the tilt of the bright portions and the dark portion as shown in FIG. 11, the helical pitch substantially matches the pitch P of the bright and dark lines shown in FIG. 9. In addition, in a case where the tilt of the liquid crystal compound does not match with the tilt of the bright portions and the dark portion as shown in FIG. 8, the helical pitch slightly deviates from the pitch P of the bright and dark lines shown in FIG. 9. However, the following description will be made without distinguishing between the helical pitch and the pitch of the bright and dark lines.

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with an SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 10:
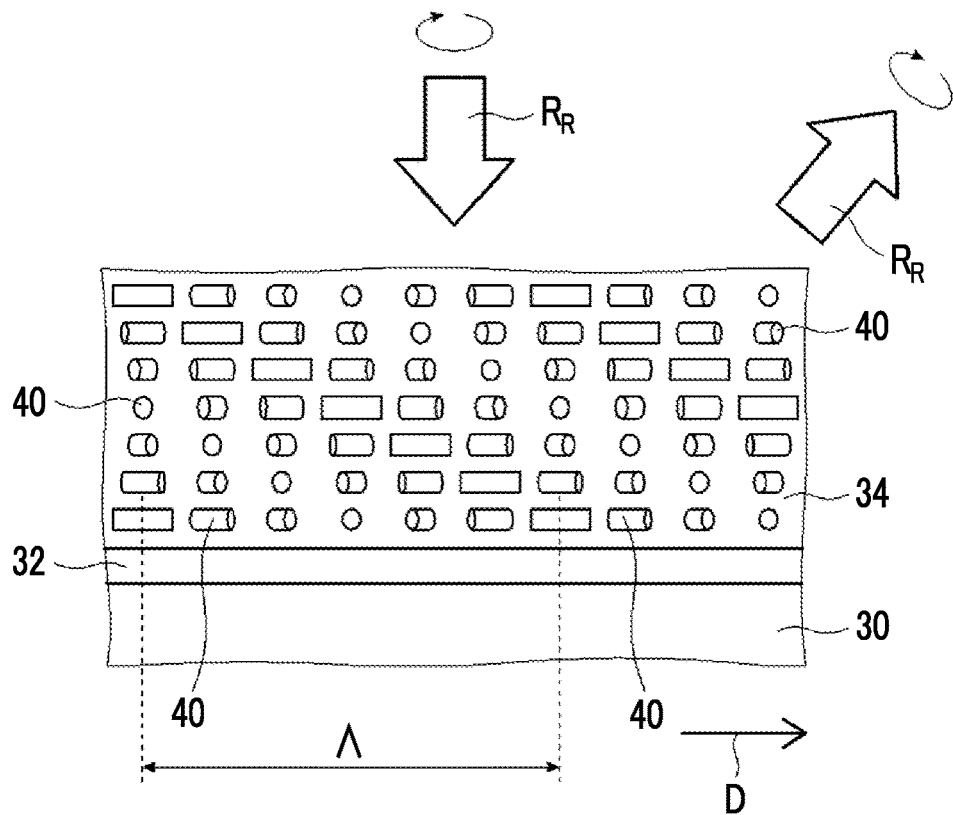
FIG. 10 is a conceptual diagram showing an action of the cholesteric liquid crystal layer shown in FIG. 7.

On the other hand, the liquid crystal layer 34 reflects incident light in a state where it is tilted in the arrangement axis D direction with respect to the specular reflection. The liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 10.

For example, it is assumed that the liquid crystal layer 34 is a cholesteric liquid crystal layer that selectively reflects right circularly polarized light $R_R$ of red light. Accordingly, in a case where light is incident into the liquid crystal layer 34, the liquid crystal layer 34 reflects only right circularly polarized light $R_R$ of red light and allows transmission of the other light.

Here, in the liquid crystal layer 34, the optical axis 40A of the liquid crystal compound 40 changes while rotating in the arrangement axis D direction (the one in-plane direction). The liquid crystal alignment pattern formed in the liquid crystal layer 34 is a pattern that is periodic in the arrangement axis D direction. Therefore, as conceptually shown in FIG. 10, the right circularly polarized light $R_R$ of red light incident into the liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the XY plane (the main surface of the cholesteric liquid crystal layer) in the arrangement axis D direction.

As a result, in a case where the liquid crystal layer 34 is applied to a light guide element or the like, the liquid crystal layer 34 can be used as a diffraction element in which light incident from a direction perpendicular to the main surface of the light guide plate can be reflected (diffracted) at an angle at which total reflection occurs in the light guide plate and the light guided in the light guide plate by total reflection can be reflected (diffracted) in a direction perpendicular to the main surface of the light guide plate.

In the liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

For example, in FIGS. 7 and 8, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

In the liquid crystal layer, the length over which the optical axis of the liquid crystal compound rotates by 180° in the liquid crystal alignment pattern of the liquid crystal compound is the single period Λ of the diffraction structure, and the one in-plane direction (arrangement axis D direction) in which the optical axis of the liquid crystal compound changes while rotating is the periodic direction of the diffraction structure.

In the liquid crystal layer having the liquid crystal alignment pattern, as the single period Λ decreases, the angle of reflected light with respect to the incidence light increases. That is, as the single period Λ decreases, reflected light can be reflected in a state where it is largely tilted with respect to incidence light. Accordingly, the single period of the liquid crystal alignment pattern in the liquid crystal layer of each of the diffraction elements may be appropriately set depending on the diffraction angles, arrangement, and the like of the diffraction elements.

The periods (single periods Λ) of the diffraction structures of the diffraction elements are preferably 0.1 to 10 more preferably 0.1 to 1 still more preferably 0.1 to 0.8 and still more preferably a wavelength λ or less of incident light from the viewpoint of propagating light in the light guide plate 16 by total reflection.

In addition, in the liquid crystal layer of the incidence diffraction element and the liquid crystal layer of the emission diffraction element that diffract light having the same wavelength, the helically twisted rotation directions of the cholesteric liquid crystalline phases are the same.

Here, the example shown in FIG. 8 shows the configuration in which, on the X-Z plane of the liquid crystal layer 34, the optical axis 40A of the liquid crystal compound 40 is aligned to be parallel to the main surface (X-Y plane). However, the present invention is not limited to this configuration. For example, as shown in FIG. 11, a configuration in which, on the X-Z plane of the liquid crystal layer 34, the optical axes 40A of the liquid crystal compound 40 are aligned to be tilted with respect to the main surface (X-Y plane) may be adopted.

In addition, the example shown in FIG. 11 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

Figure 12:
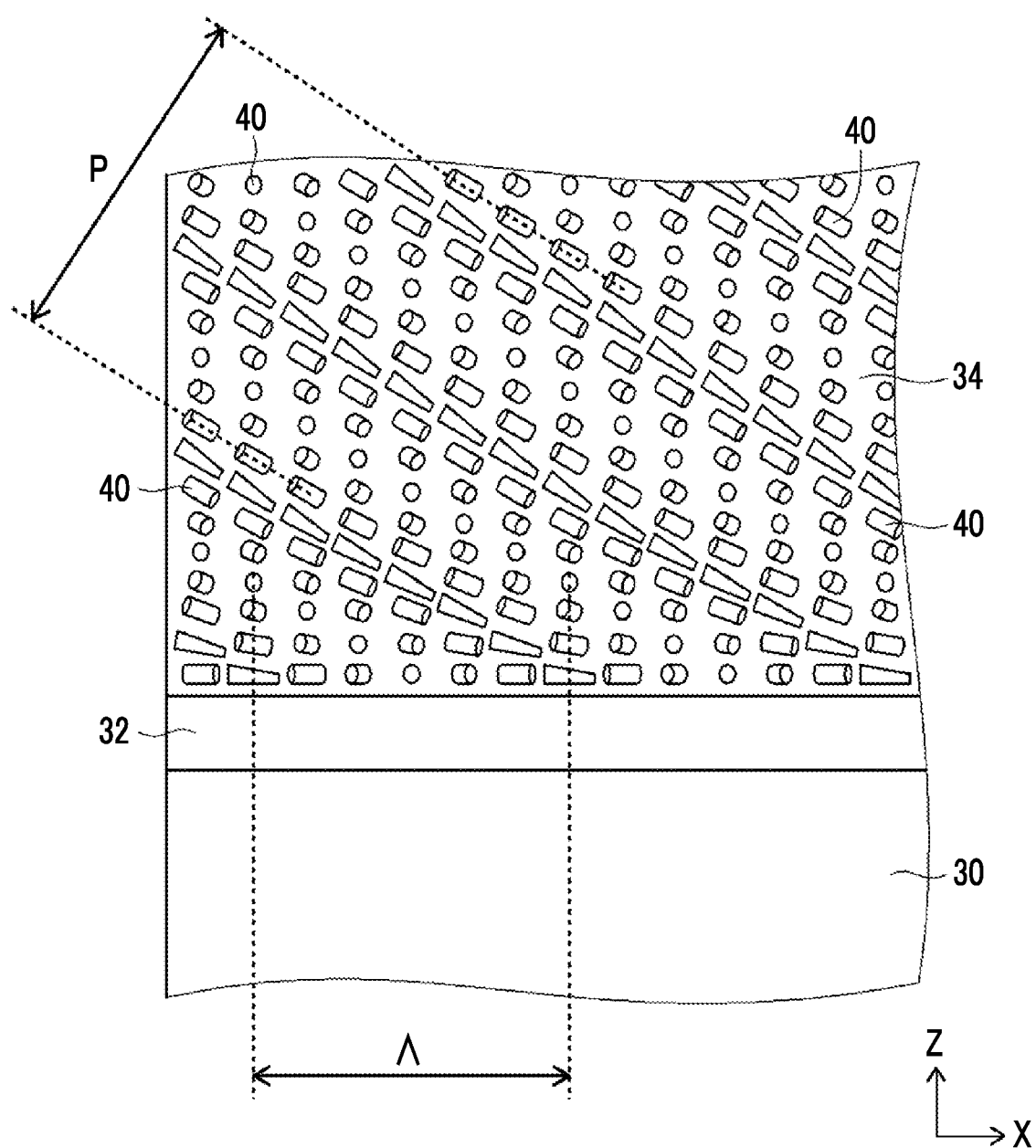
FIG. 12 is a diagram conceptually showing another example of the cholesteric liquid crystal layer used as a diffraction element.

For example, in an example shown in FIG. 12, the optical axis 40A of the liquid crystal compound 40 at an interface of the liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface).

This way, the liquid crystal layer may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 34 with a polarization microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the diffraction element (liquid crystal layer) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is desirable that the tilt angle is controlled by treating the interface of the liquid crystal layer. By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, it is preferable that the liquid crystal layer 34 has a pitch gradient layer where the helical pitch P changes in a thickness direction. Specifically, in the liquid crystal layer 34, it is preferable that the helical pitch changes to gradually increase (or decrease) from one main surface side to another main surface side of the liquid crystal layer 34. In the liquid crystal layer 34, by changing the helical pitch P in the thickness direction, the selective reflection wavelength can be widened.

In addition, in a case where the liquid crystal layer 34 is the pitch gradient layer, in the liquid crystal layer 34, it is preferable that the single period $\Lambda$, a helical pitch P1 on one surface side of the pitch gradient layer, and a helical pitch P2 on another surface side of the pitch gradient layer satisfy P1<$\Lambda$<P2.

As a result, the diffraction efficiency with respect to light incident from an oblique direction can be increased.

Here, in a cross-section of the liquid crystal layer observed with an SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

Here, in the present invention, the refractive index of the liquid crystal layer forming the diffraction element is higher than or equal to the refractive index of the light guide plate.

A method of adjusting the refractive index of the liquid crystal layer is not particularly limited, and examples thereof include a method of using a liquid crystal compound having a higher refractive index and a method of adding nanoparticles having a high refractive index to the liquid crystal layer.

In order to increase the refractive index of the liquid crystal compound, for example, it is efficient to increase a wavelength of absorption of the liquid crystal compound and/or to increase a molar absorption coefficient and to make a structure of the liquid crystal compound a stiff chain. More specifically, for example, a method of introducing at least one selected from the group consisting of an aromatic ring, a halogen atom other than a fluorine atom, a sulfur atom, an alicyclic group, a double bond group, and a triple bond group into the liquid crystal compound can be used.

In addition, examples of the nanoparticles having a high refractive index include zirconium oxide and titanium oxide.

As a method of measuring the refractive index of the liquid crystal layer, for example, the refractive index can be measured by applying a liquid crystal composition for forming a liquid crystal layer to a support with an alignment film that is prepared separately, aligning a director of the liquid crystal compound to be parallel to a substrate, irradiating the liquid crystal compound with ultraviolet light for immobilization to obtain a liquid crystal immobilized layer (cured layer), and measuring an in-plane average refractive index of the liquid crystal immobilized layer using a spectroscopic reflectometer FE-3000 for film thickness (manufactured by Otsuka Electronics Co., Ltd.). Alternatively, the refractive index of the cholesteric liquid crystal layer can be directly measured using an Abbe refractometer or a spectroscopic ellipsometer.

In a case where the diffraction element includes a support or the like, it is preferable that a liquid crystal layer having a high refractive index is disposed adjacent to the light guide plate. Alternatively, it is preferable that a support formed of a material having a high refractive index is used as the support.

Method of Forming Liquid Crystal Layer

The liquid crystal layer can be formed by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a liquid crystal phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

Polymerizable Liquid Crystal Compound

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

As the liquid crystal compound, a compound represented by Formula (1) is preferable.

Formula (I)

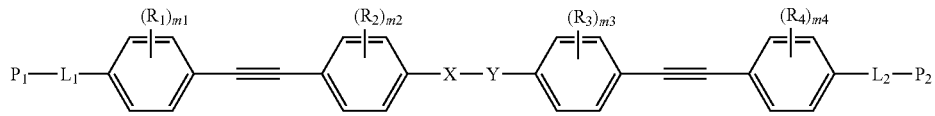

In Formula (1), $P_1$ and $P_2$ each independently represent a polymerizable group.

The kind of the polymerizable group is not particularly limited, and examples thereof include a well-known polymerizable group. From the viewpoint of reactivity, a functional group capable of an addition polymerization reaction is preferable, and a polymerizable ethylenically unsaturated group or a ring polymerizable group is more preferable. Examples of the polymerizable group include a (meth)acryloyloxy group, a vinyl group, a maleimide group, an acetyl group, a styryl group, an allyl group, an epoxy group, an oxetane group, and a group including the above-described group. A hydrogen atom in each of the groups may be substituted with another substituent such as a halogen atom.

$L_1$ and $L_2$ each independently represent a single bond or a divalent linking group. Examples of the divalent linking group include an ether group (—O—), a carbonyl group (—CO—), an ester group (—COO—), a thioether group (—S—), —SO$_2$—, —NR— (R represents a hydrogen atom or an alkyl group), a divalent hydrocarbon group (for example, a saturated hydrocarbon group such as an alkylene group, an alkenylene group (for example, —CH=CH—), an alkynylene group (for example, —C≡C—), or an arylene group), and a group including a combination thereof.

As an atom that is directly bonded to a benzene ring group in Formula (1) in the divalent linking group, a carbon atom is preferable, and a sp3 carbon atom (a carbon atom having only a single bond) is preferable as the carbon atom.

As the divalent linking group, a divalent hydrocarbon group having 1 to 20 carbon atoms which may have a substituent is preferable. One or methylene groups in the divalent hydrocarbon group may be each independently substituted with —O— or —C(=O)—. One methylene group may be substituted with —O— and a methylene group adjacent thereto may be substituted with —C(=O)— to form an ester group.

As the substituent which may be included in the divalent hydrocarbon group, for example, a fluorine atom is preferable.

The number of carbon atoms in the divalent hydrocarbon group is 1 to 20, preferably 1 to 10, and more preferably 1 to 5.

The divalent hydrocarbon group may be linear or branched and may have a cyclic structure.

In particular, it is preferable that $L_1$ represents a group represented by Formula (A) and $L_2$ represents a group represented by Formula (B).

$$*-Z_1-Sp_1-** \quad \text{Formula (A)}$$

$$*-Z_2-Sp_2-** \quad \text{Formula (B)}$$

$Z_1$ and $Z_2$ each independently represent —C($R_{za}$)($R_{zb}$)—.

$R_{za}$ and $R_{zb}$ each independently represent a hydrogen atom or a substituent and preferably a hydrogen atom.

$Sp_1$ and $Sp_2$ each independently represent a divalent hydrocarbon group having 1 to 19 carbon atoms which may have a fluorine atom or a single bond. One or methylene groups in the divalent hydrocarbon group may be each independently substituted with —O— or —C(=O)—. One methylene group may be substituted with —O— and a methylene group adjacent thereto may be substituted with —C(=O)— to form an ester group.

The divalent hydrocarbon group may be linear or branched and may have a cyclic structure.

*'s each independently represent a bonding position to a benzene ring group that is directly bonded to $L_1$ or $L_2$, and **'s each independently represent a bonding position to $P_1$ or $P_2$.

X represents —C($R_{xa}$)($R_{xb}$)—. $R_{xa}$ and $R_{xb}$ each independently represent a hydrogen atom or a substituent.

$R_{xa}$ and $R_{xb}$ represent preferably a hydrogen atom.

Y represents —C($R_{ya}$)($R_{yb}$)—, —O—, —$NR_{ya}$—, or S. $R_{ya}$ and $R_{yb}$ each independently represent a hydrogen atom or a sub stituent. $R_{ya}$ may represent a hydrogen atom or an alkyl group having 1 to 6 carbon atoms (which may be linear or branched, may have a cyclic structure, and may further have a substituent).

In particular, Y represents preferably —C($R_{ya}$)($R_{yb}$)— or —O— and, from the viewpoint of further suppressing coloration of the compound, more preferably —C($R_{ya}$)($R_{yb}$)—.

$R_1$ to $R_4$ each independently represent a substituent.

The substituents each independently represent preferably an alkyl group having 1 to 20 carbon atoms (preferably 1 to 10 carbon atoms and more preferably 2 to 5 carbon atoms), an alkoxy group having 1 to 20 carbon atoms, an alkanoyl group having 1 to 20 carbon atoms, an alkanoyloxy group having 1 to 20 carbon atoms, an alkyloxycarbonyl group having 1 to 20 carbon atoms (preferably 2 to 6 carbon atoms), an alkylamino group having 1 to 20 carbon atoms, an alkylaminocarbonyl group having 1 to 20 carbon atoms, an alkanoylamino group having 1 to 20 carbon atoms, a cyano group, a nitro group, a halogen atom, or a group having a polymerizable group.

In a case where the substituent may be linear or branched, the substituent may be linear or branched. In addition, if possible, the substituent may have a cyclic structure.

One or more methylene groups in the alkyl group and the alkyl group portion (for example, a portion other than —O— in the alkoxy group) of the substituent may be each independently substituted with —O— or —C(=O)—.

In addition, if possible, the substituent may further have a substituent (preferably, a fluorine atom). For example, it is preferable that the alkyl group is a fluoroalkyl group (for example, a perfluoroalkyl group having 1 to 10 carbon atoms such as a trifluoromethyl group). In addition, it is preferable that the alkyl group portion of the substituent has a fluorine atom.

In particular, from the viewpoints excellent liquid crystallinity and solubility of the compound, as the substituent, the alkyl group, the alkyloxycarbonyl group, or the alkylaminocarbonyl group is preferable, an alkyl group having 2 or more carbon atoms, a fluoromethyl group (preferably a trifluoromethyl group), the alkyloxycarbonyl group, or the alkylaminocarbonyl group is more preferable, and the alkyloxycarbonyl group or the alkylaminocarbonyl group is still more preferable, and the alkyloxycarbonyl group is still more preferable.

$m_1$ to $m_4$ each independently represent an integer of 0 to 4. In a case where $R_1$ to $R_4$ corresponding to $m_1$ to $m_4$ of 2 or more are each independently present in plural, a plurality of $R_1$'s to $R_4$'s may be each independently the same as or different from each other.

From the viewpoints excellent liquid crystallinity and solubility of the compound, it is preferable that at least one of $m_1$, . . . , or $m_4$ represents an integer of 1 or more. In particular, it is preferable that $m_3$ represents an integer of 1 or more.

In particular, at least one of $m_1$, . . . , or $m_4$ represents an integer of 1 or more, and at least one of $R_1$, . . . , or $R_4$ corresponding to at least one of $m_1$, . . . , or $m_4$ that represents an integer of 1 or more represents preferably the alkyl group, the alkyloxycarbonyl group, or the alkylaminocarbonyl group, more preferably an alkyl group having 2 or more carbon atoms, a fluoromethyl group (preferably a trifluoromethyl group), the alkyloxycarbonyl group, or the alkylaminocarbonyl group, still more preferably the alkyloxycarbonyl group or the alkylaminocarbonyl group, and still more preferably the alkyloxycarbonyl group. In particular, it is preferable that $m_3$ represents an integer of 1 or more and at least one of $R_3$'s represents the alkyl group, the alkyloxycarbonyl group, or the alkylaminocarbonyl group.

"At least one of $R_1$, . . . , or $R_4$ corresponding to at least one of $m_1$, . . . , or $m_4$ that represents an integer of 1 or more represents the alkyl group or the like" represents, for example, an aspect where, in a case where $m_1$ represents an integer of 1 or more and $m_2$ to $m_4$ represent 0, $R_1$ corresponding to $m_1$ represents the group. In addition, in another example, an aspect where, in a case where $m_1$ and $m_2$ represent an integer of 1 or more and $m_3$ and $m_4$ represent 0, at least one of $R_1$ corresponding to $m_1$ or $R_2$ corresponding to $m_2$ represents the above-described group can be adopted.

Disk-Like Liquid Crystal Compound

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

Surfactant

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable.

As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

Polymerization Initiator

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an $\alpha$-carbonyl compound (described in U.S. Pat. Nos. 2,367,661A and 2,367,670A), an acyloin ether (described in U.S. Pat. No. 2,448,828A), an $\alpha$-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

Crosslinking Agent

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

Other Additives

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these crosslinking agents, one kind may be used alone, or two or more kinds may be used in combination. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystalline phase, and curing the liquid crystal compound.

That is, in a case where the cholesteric liquid crystal layer is formed on the alignment film 32, it is preferable that the liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer is not particularly limited, and the thickness with which a required light reflectivity can be obtained may be appropriately set depending on the use of the diffraction element, the light reflectivity required for the liquid crystal layer, the material for forming the liquid crystal layer, and the like.

Transmissive Liquid Crystal Diffraction Element

In the above-described example, the liquid crystal layer obtained by cholesteric alignment of the liquid crystal compound is used as the liquid crystal diffraction element. Various liquid crystal diffraction elements can be used as the liquid crystal diffraction element used in the present invention as long as they have the liquid crystal alignment pattern in which the optical axis 40A derived from the liquid crystal compound 40 continuously rotates in at least one in-plane direction.

In the present invention, a liquid crystal diffraction element that has the liquid crystal alignment pattern where the optical axis continuously rotates in at least one in-plane direction and in which the liquid crystal compound does not form a cholesteric liquid crystalline phase in the thickness direction can also be used. The liquid crystal diffraction element may have a configuration in which the liquid crystal compound is helically twisted and rotates in the thickness direction to some extent that a cholesteric liquid crystalline phase is not formed.

Figure 14:
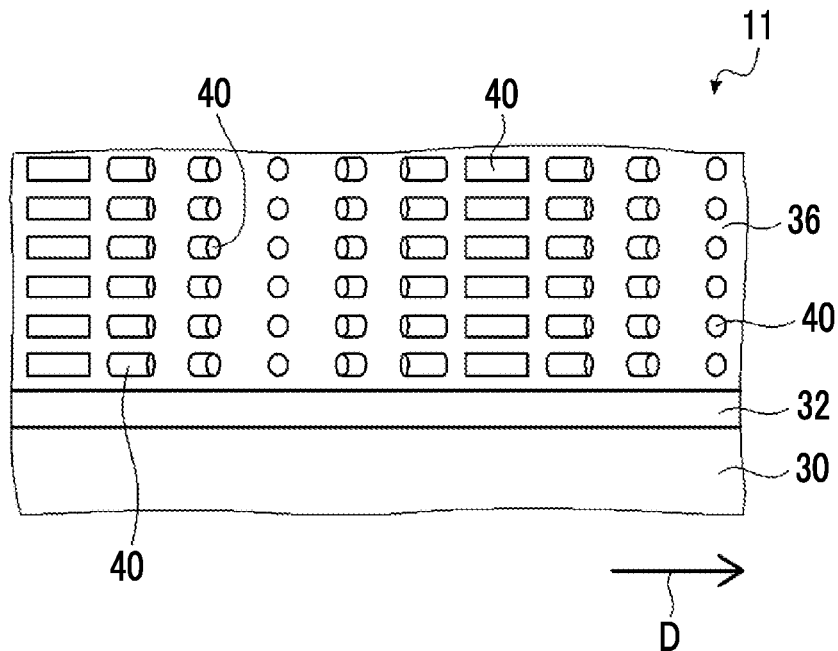
FIG. 14 is a diagram conceptually showing an example of a liquid crystal layer in a transmissive liquid crystal diffraction element.
Figure 15:
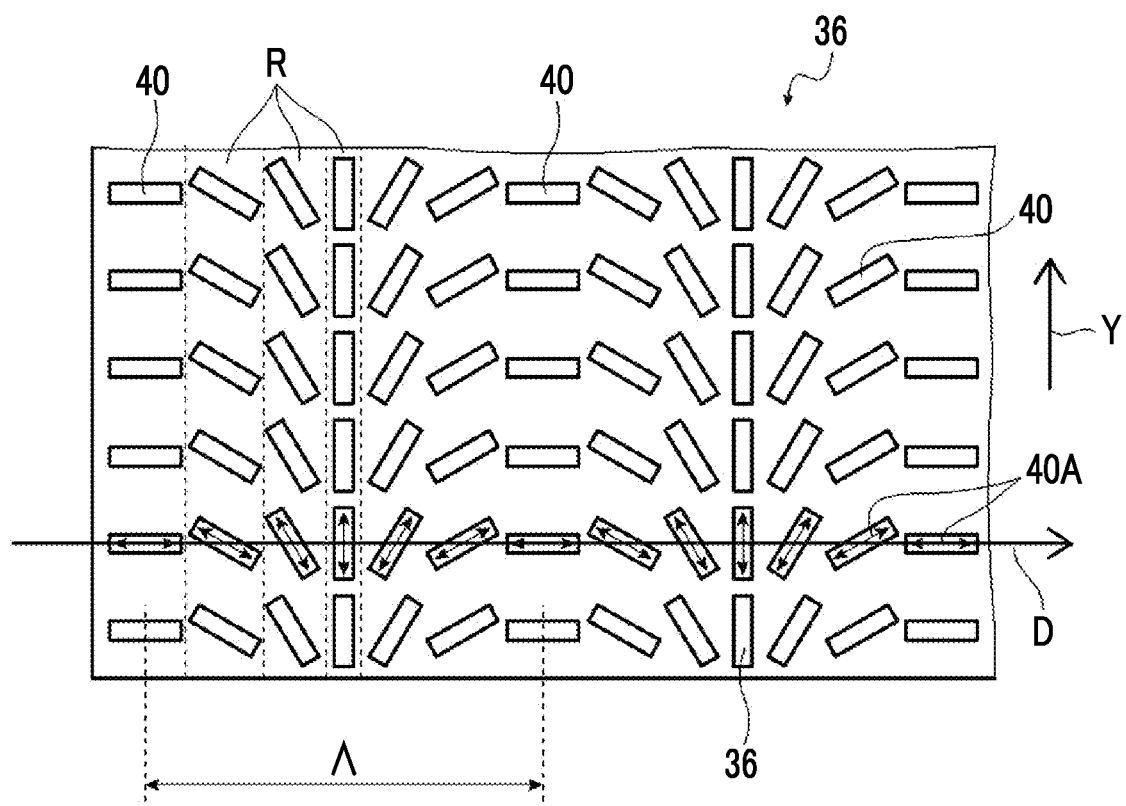
FIG. 15 is a plan view showing the liquid crystal layer shown in FIG. 14.

FIGS. 14 and 15 show an example of the transmissive liquid crystal diffraction element.

A liquid crystal diffraction element shown in FIGS. 14 and 15 includes the support 30, the alignment film 32, and a liquid crystal layer 36.

As in the liquid crystal layer 34, the liquid crystal layer 36 of the liquid crystal diffraction element shown in FIG. 15 also has the liquid crystal alignment pattern in which the optical axis 40A of the liquid crystal compound 40 continuously rotates in the arrangement axis D direction. FIG. 15 also shows only the liquid crystal compound of the surface of the alignment film 32 as in FIG. 7.

In the liquid crystal diffraction element shown in FIG. 14, the liquid crystal compound 40 forming the liquid crystal layer 36 is not helically twisted and does not rotate in the thickness direction, and the optical axis 40A is positioned at the same position in the plane direction. The liquid crystal layer can be formed by adding a chiral agent to a liquid crystal composition during the formation of the liquid crystal layer.

As described above, the liquid crystal layer 36 has the liquid crystal alignment pattern in which the direction of the optical axis 40A derived from the liquid crystal compound 40 changes while continuously rotating in the arrangement axis D direction in a plane, that is, in the one in-plane direction indicated by arrow D.

On the other hand, regarding the liquid crystal compound 40 forming the liquid crystal layer 36, the liquid crystal compounds 40 having the same direction of the optical axes 40A are arranged at regular intervals in the Y direction perpendicular to the arrangement axis D direction, that is, the Y direction perpendicular to the one in-plane direction in which the optical axis 40A continuously rotates.

In other words, regarding the liquid crystal compound 40 forming the liquid crystal layer 36, in the liquid crystal compounds 40 arranged in the Y direction, angles between the directions of the optical axes 40A and the arrangement axis D direction are the same.

In the liquid crystal compounds arranged in the Y direction in the liquid crystal layer 36, the angles between the optical axes 40A and the arrangement axis D direction (the one in-plane direction in which the direction of the optical axis of the liquid crystal compound 40 rotates) are the same. Regions where the liquid crystal compounds 40 in which the angles between the optical axes 40A and the arrangement axis D direction are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference $\Delta n$ in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference $\Delta n$ in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference $\Delta n$ in refractive index is the same as the difference in refractive index of the liquid crystal compound 40.

In a case where circularly polarized light is incident into the above-described liquid crystal layer 36, the light is refracted such that the direction of the circularly polarized light is converted.

Figure 16:
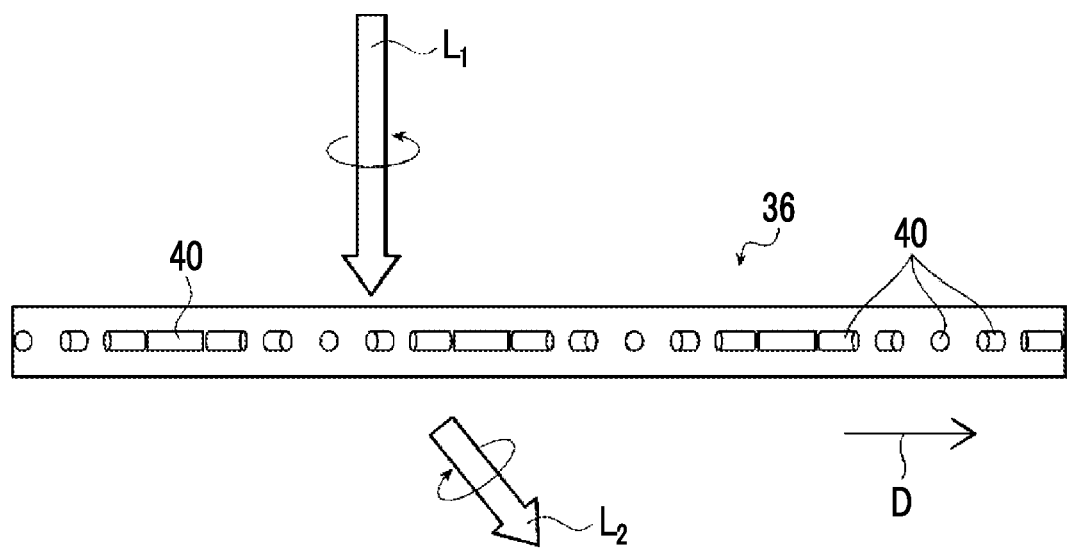
FIG. 16 is a conceptual diagram showing an action of the liquid crystal layer shown in FIG. 14.
Figure 17:
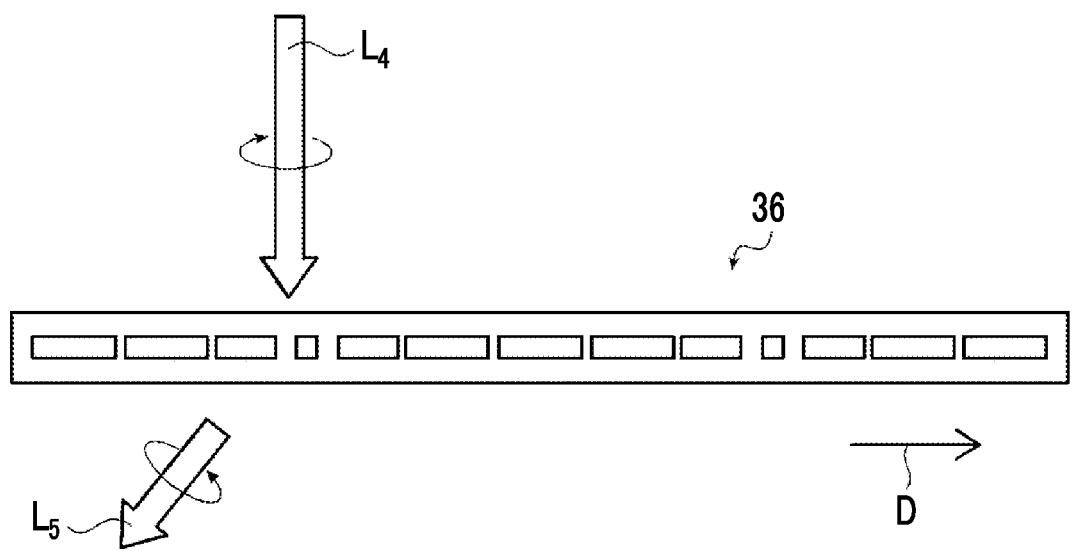
FIG. 17 is a conceptual diagram showing the action of the liquid crystal layer shown in FIG. 14.

This action is conceptually shown in FIGS. 16 and 17. In the liquid crystal layer 36, the value of the product of the difference in refractive index of the liquid crystal compound and the thickness of the optically-anisotropic layer is $\lambda/2$.

As shown in FIG. 16, in a case where the value of the product of the difference in refractive index of the liquid crystal compound in the liquid crystal layer 36 and the thickness of the optically-anisotropic layer is $\lambda 2$ and incidence light $L_1$ as left circularly polarized light is incident into the liquid crystal layer 36, the incidence light $L_1$ transmits through the liquid crystal layer 36 to be imparted with a retardation of 180°, and the transmitted light $L_2$ is converted into right circularly polarized light.

In addition, the liquid crystal alignment pattern formed in the liquid crystal layer 36 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 17, in a case where the value of the product of the difference in refractive index of the liquid crystal compound in the liquid crystal layer 36 and the thickness of the optically-anisotropic layer is $\lambda/2$ and incidence light $L_4$ of right circularly polarized light is incident into the liquid crystal layer 36, the incidence light $L_4$ transmits through the liquid crystal layer 36 to be imparted with a retardation of 180°, and the transmitted light $L_4$ is converted into transmitted light $L_5$ of left circularly polarized light.

In addition, the liquid crystal alignment pattern formed in the liquid crystal layer 36 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrow X direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

As in the liquid crystal layer 34, by changing the single period $\Lambda$ of the liquid crystal alignment pattern formed in the liquid crystal layer 36, refraction angles of the transmitted light components $L_2$ and $L_5$ can be adjusted. Specifically, even in the liquid crystal layer 36, as the single period A of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D1 direction, the refraction direction of transmitted light can be reversed. That is, in the example FIGS. 14 to 17, the rotation direction of the optical axis 40A toward the arrangement axis D direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates (the twisted angle is less than 360°). In particular, in a case where light is diffracted at an angle where total reflection occurs in the light guide plate, from the viewpoint of diffraction efficiency, a liquid crystal diffraction element including a region in which a liquid crystal compound is twisted and rotates can be suitably used. In addition, from the viewpoint of diffraction efficiency, it is preferable to use a laminate in which liquid crystal diffraction elements having different angles at which the liquid crystal compound is twisted and rotates is laminated, or it is preferable to use a laminate in which liquid crystal diffraction elements having different directions in which the liquid crystal compound is twisted and rotates are laminated.

In addition, the liquid crystal diffraction element having a region in which the liquid crystal compound is twisted and rotates (the twisted angle is less than 360°) without being cholesterically aligned can also be used as a reflective diffraction element. This liquid crystal diffraction element can also function as a reflective diffraction element in which diffracted light is reflected from an interface with the liquid crystal diffraction element and emitted from the light incidence side to reflect and diffract the light.

Here, the liquid crystal layer 36 shown in FIG. 14 has a configuration in which the optical axis of the liquid crystal compound is parallel to the main surface of the liquid crystal layer, but the present invention is not limited thereto.

Figure 18:
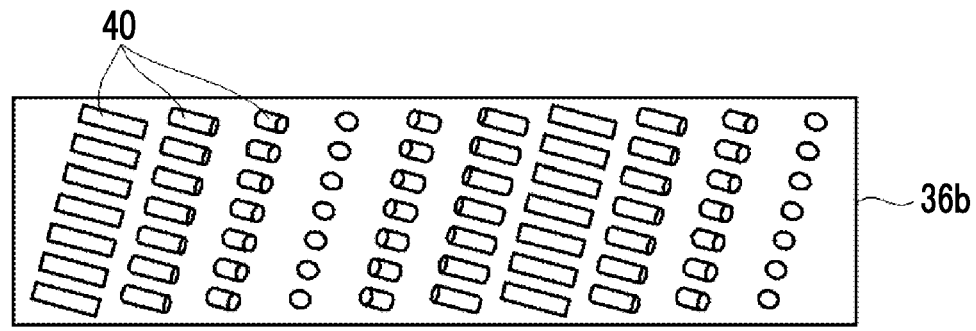
FIG. 18 is a diagram conceptually showing another example of the liquid crystal layer.

For example, as in a patterned liquid crystal layer 36b shown in FIG. 18, in the above-described liquid crystal layer, the optical axis of the liquid crystal compound may be tilted with respect to the main surface of the liquid crystal layer. This liquid crystal layer is the same as the liquid crystal layer 36 in that they have the liquid crystal alignment pattern in which the direction of the optical axis derived from the liquid crystal compound changes while continuously rotating in the one in-plane direction. That is, the plan view of the liquid crystal layer 36b is the same as that of FIG. 15.

In the light guide element according to the embodiment of the present invention, different kinds of diffraction elements may be used in combination as the diffraction elements. For example, a transmissive liquid crystal diffraction element may be used as the diffraction element on the incidence side, and a reflective liquid crystal diffraction element may be used as the diffraction element on the emission side.

In order to improve visibility for the light guide element according to the embodiment of the present invention, a diffractive optical method of enlarging an exit pupil may be used.

Specifically, a diffractive optical method of using a plurality of diffraction components (diffraction elements), that is, an optical method of using in-coupling, intermediate and out-coupling diffractive elements can be used. This method is described in detail in JP2008-546020A.

Hereinabove, the light guide element according to the embodiment of the present invention has been described above. However, the present invention is not limited to the above-described examples, and various improvements and modifications can be made within a range not departing from the scope of the present invention.

Examples

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

Preparation of Diffraction Element

Formation of Alignment Film

A glass substrate was used as the support. The following coating liquid for forming an alignment film was applied to the support using a spin coater at 2500 rpm for 30 seconds. The support on which the coating film of the coating liquid for forming an alignment film was formed was dried using a hot plate at 60° C. for 60 seconds. As a result, an alignment film was formed.

| Coating Liquid for Forming Alignment Film | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment

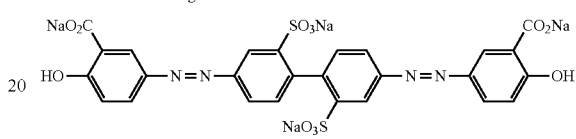

Exposure of Alignment Film

The alignment film was exposed using the exposure device shown in FIG. 13 to form an alignment film P-1 having an alignment pattern.

In the exposure device, a laser that emits laser light having a wavelength (325 nm) was used as the laser. The exposure amount of the interference light was 320 mJ/cm$^2$. An intersecting angle (intersecting angle α) between the two beams was adjusted to 51.3° such that the single period (the length over which the optical axis rotates by 180°) of an alignment pattern formed by interference of two laser beams was 0.410 μm.

(Formation of Cholesteric Liquid Crystal Layer)

As the liquid crystal composition forming the cholesteric liquid crystal layer, the following liquid crystal composition LC-1 was prepared.

| Liquid Crystal Composition LC-1 | |
|---|---|
| Liquid crystal compound L-1 | 40.0 parts by mass |
| Liquid crystal compound L-2 | 60.0 parts by mass |
| Polymerization initiator (IRGACURE 907, manufactured by BASF SE) | 3.0 parts by mass |
| Photosensitizer (KAYACURE DETX-S, manufactured by Nippon Kayaku Co., Ltd.) | 1.0 part by mass |
| Chiral agent Ch-1 | 5.7 parts by mass |
| Methyl ethyl ketone | 164.6 parts by mass |

Liquid Crystal Compound L-1

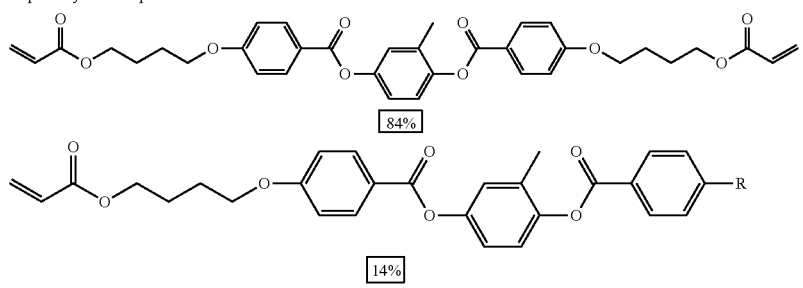

-continued

Liquid Crystal Composition LC-1

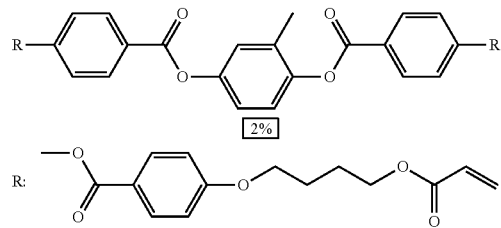

Liquid Crystal Compound L-2

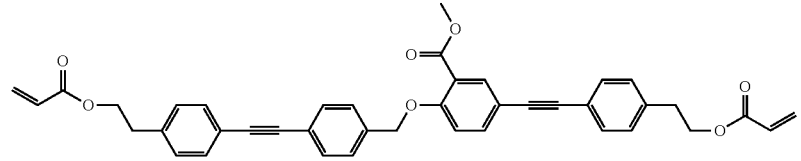 [SMILES: C=CC(=O)OCCc1ccc(C#Cc2ccc(COc3ccc(C#Cc4ccc(CCOC(=O)C=C)cc4)cc3C(=O)OC)cc2)cc1]

Δn of a liquid crystal compound where the liquid crystal compound L-1 and the liquid crystal compound L-2 were mixed at a ratio of 40:60 was measured by pouring the liquid crystal compound into a wedge cell, emitting laser light having a wavelength of 552 nm, and measuring the refraction angle of the transmitted light. Δn of the liquid crystal compound L-1 was 0.23.

Chiral Agent Ch-1

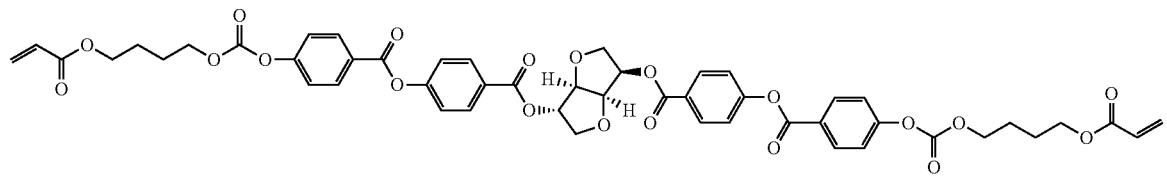

This chiral agent Ch-1 is a chiral agent that turns the liquid crystal compound in a right-twisted helical shape. Accordingly, the cholesteric liquid crystal layer selectively reflects right circularly polarized light.

The liquid crystal composition LC-1 was applied to the alignment film P-1 using a spin coater at 800 rpm for 10 seconds. The coating film of the liquid crystal composition LC-1 was heated on a hot plate at 80° C. for 3 minutes (180 sec). Next, the coating film was irradiated with ultraviolet light having a wavelength of 365 nm at 80° C. at an irradiation dose of 300 mJ/cm$^2$ using a high-pressure mercury lamp in a nitrogen atmosphere. As a result, the liquid crystal composition LC-1 was cured, the alignment of the liquid crystal compound was immobilized, and a cholesteric liquid crystal layer was formed. Thus, a liquid crystal diffraction element including the support, the alignment film, and the cholesteric liquid crystal layer shown in FIG. 12 was prepared.

It was verified using a polarization microscope that the cholesteric liquid crystal layer had a periodically aligned surface as shown in FIG. 7.

The liquid crystal diffraction element was cut in a direction along the rotation direction of the optical axis, and a cross-section was observed with an SEM. By analyzing the SEM image, the single period Λ of the liquid crystal alignment pattern of the cholesteric liquid crystal layer and length pitches P1 and P2 of one helical pitch were measured. P1 is a measured value on the glass substrate side with respect to a thickness direction in the cholesteric liquid crystal layer, and P2 is a measured value on the air interface side with respect to a thickness direction in the cholesteric liquid crystal layer. The measurement results are shown in the following Table 1.

Measurement of In-plane Average Refractive Index of Diffraction Element

A liquid crystal composition LC-1 was applied to a support with an alignment film that was prepared separately, a director of the liquid crystal compound was aligned to be parallel to a substrate, the liquid crystal compound was irradiated with ultraviolet light for immobilization to obtain a liquid crystal immobilized layer (cured layer), and an in-plane average refractive index of the liquid crystal immobilized layer was measured using a spectroscopic reflectometer FE-3000 for film thickness (manufactured by Otsuka Electronics Co., Ltd.).

Example 2

Liquid crystal diffraction elements were prepared using the same method as that of Example 1, except that the composition of the liquid crystal composition and the conditions in the application step and the exposure step were changed as shown in Table 1.

In Example 2, the liquid crystal composition was exposed at 100° C. using a high-pressure mercury lamp through a long pass filter of 300 nm and a short pass filter of 350 nm in the first exposure step before the second exposure step for curing the liquid crystal composition. The first exposure step was performed such that the light irradiation dose measured at a wavelength of 315 nm was 4 mJ/cm$^2$.

The liquid crystal diffraction element prepared in Example 2 has the pitch gradient layer.

Examples 3 and 4 and Comparative Example 1

Liquid crystal diffraction elements were prepared using the same method as that of Example 2, except that the composition of the liquid crystal composition and the conditions in the application step and the exposure step were changed as shown in Table 1, and the same measurement was performed.

Chiral Agent Ch-2

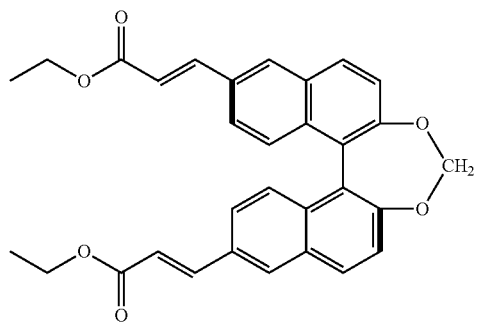

Evaluation

Measurement of Diffraction Efficiency

In a case where the prepared liquid crystal diffraction element was disposed in a light guide plate having a high refractive index, a diffraction efficiency in a predetermined incidence angle range was measured using the following method.

Figure 19:
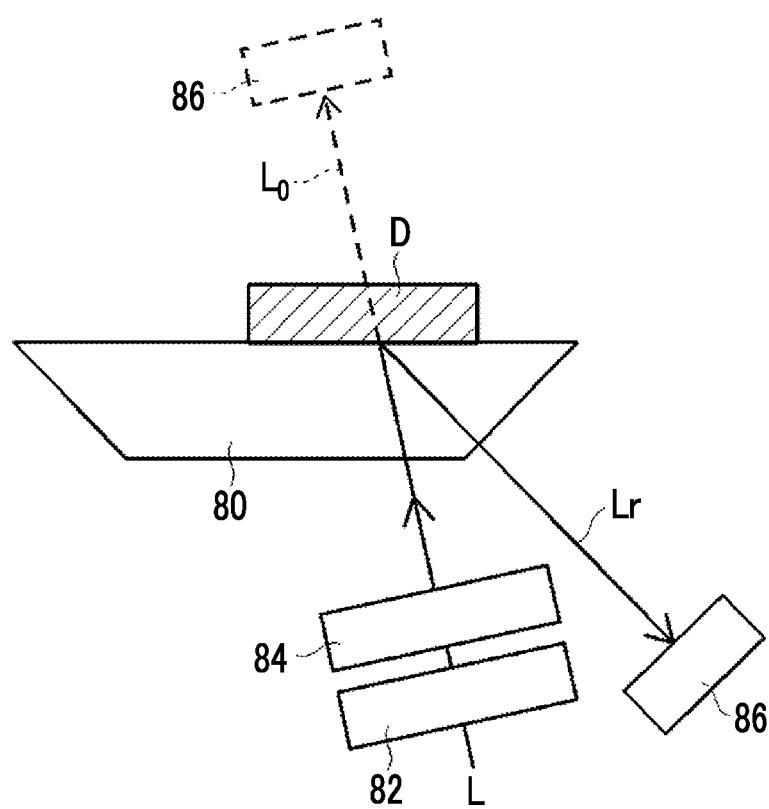
FIG. 19 is a diagram conceptually showing a method of measuring a diffraction efficiency.

As shown in FIG. 19, the prepared liquid crystal diffraction element D was disposed in a dove prism 80. As the dove prism 80, a dove prism having a slope angle of 45° was used. In addition, the refractive index of the dove prism was 1.70.

In the dove prism 80, laser light having a wavelength of 552 nm was caused to transmit through a linear polarizer 82 and a λ/4 plate 84 to be converted into right circularly polarized light, and the light was incident into a surface of the liquid crystal diffraction element D while changing the angle in an angle range where light was guided shown in Table 1.

The intensities of diffracted light $L_d$ and 0-order transmitted light $L_O$ were measured using a measuring instrument 86 (Power Meter 1918-C, manufactured by Newport Corporation), and a diffraction efficiency was obtained from $L_d/(L_d+L_O) \times 100(\%)$. The obtained diffraction efficiency was evaluated based on the following standards. The results are shown in Table 1.

AA: a case where the value of the lowest diffraction efficiency in the incidence angle range where light was guided was more than 80% and 100% or less A: a case where the value of the lowest diffraction efficiency in the incidence angle range where light was guided was more than 50% and 80% or less B: a case where the value of the lowest diffraction efficiency in the incidence angle range where light was guided was more than 10% and 50% or less C: a case where the value of the lowest diffraction efficiency in the incidence angle range where light was guided was more than 0% and 10% or less

TABLE 1

| | | Example 1 | Example 2 | Example 3 | Example 4 | Comparative Example 1 |
|---|---|---|---|---|---|---|
| Composition | Liquid Crystal Compound [Part(s) by Mass] | L-1 40 | — | L-1 40 | L-1 40 | L-1 100 |
| | Liquid Crystal Compound [Part(s) by Mass] | L-2 60 | L-2 100 | L-2 60 | L-2 60 | — |
| | Polymerization Initiator [Part(s) by Mass] | Irgacure 907 3 | KAYACURE DETX-S 1 | KAYACURE DETX-S 1 | KAYACURE DETX-S 1 | KAYACURE DETX-S 1 |
| | Photosensitizer [Part(s) by Mass] | KAYACURE DETX-S 1 | — | — | — | — |
| | Chiral Agent [Part(s) by Mass] | Ch-1 5.7 | Ch-2 6.0 | Ch-2 5.8 | Ch-2 5.2 | Ch-2 4.0 |
| | Solvent [Part(s) by Mass] | MEK 164.6 | MEK 160.5 | MEK 160.3 | MEK 159.3 | MEK 157.5 |
| First Exposure Step | Temperature [° C.] | — | 100 | 100 | 100 | 100 |
| | Irradiation Dose [mJ/cm$^2$] | — | 4 | 4 | 4 | 4 |
| | Environment (Atmosphere) | — | Nitrogen | Nitrogen | Nitrogen | Nitrogen |
| Second Exposure Step | Temperature [° C.] | 80 | 100 | 100 | 100 | 100 |
| | Irradiation Dose [mJ/cm$^2$] | 300 | 1000 | 1000 | 1000 | 1000 |
| | Environment (Atmosphere) | Nitrogen | Nitrogen | Nitrogen | Nitrogen | Nitrogen |
| Light Guide Plate | Refractive Index | 1.7 | 1.7 | 1.7 | 1.7 | 1.7 |

TABLE 1-continued

|  |  | Example 1 | Example 2 | Example 3 | Example 4 | Comparative Example 1 |
|---|---|---|---|---|---|---|
| Diffraction Element | Refractive Index | 1.7 | 1.8 | 1.7 | 1.7 | 1.6 |
|  | Helical Pitch P1 [nm] | 380 | 290 | 250 | 290 | 290 |
|  | Helical Pitch P2 [nm] | 380 | 440 | 400 | 440 | 440 |
|  | Single Period Λ [nm] | 410 | 410 | 410 | 410 | 410 |
| Incidence Angle Range where Light is Guided |  | −20° to 21° | −20° to 21° | −20° to 21° | −20° to 21° | −20° to 21° |
| Evaluation | Diffraction Efficiency | B | A | B | AA | C |

It can be seen from Table 1 that, in Examples of the present invention, the diffraction efficiency in the incidence angle range where light can be guided is higher than that of Comparative Example. That is, it can be seen that the incidence angle range at which a high diffraction efficiency can be obtained is wide.

In addition, it can be seen from a comparison between Examples 2 and 4 that it is preferable that the refractive index $n_d$ of the light guide plate and the refractive index $n_k$ of the liquid crystal layer satisfy $0.1 > n_k - n_d \geq 0$.

In addition, it can be verified from a comparison between Examples 3 and 4 that, in a case where the liquid crystal layer is the pitch gradient layer, it is preferable that the single period Λ, the helical pitch P1, and the helical pitch P2 satisfy $P1 < \Lambda < P2$.

As can be seen from the above results, the effects of the present invention are obvious.

The present invention is suitably applicable to various optical devices such as AR glasses in which light guiding is used.

EXPLANATION OF REFERENCES 10a, 10b: light guide element
11, 12, 12a: diffraction element
16, 116: light guide plate
30: support
32: alignment film
34, 36, 36b: liquid crystal layer
40: liquid crystal compound
40A: optical axis
42: bright portion
44: dark portion
50: image display apparatus
54: display
60: exposure device
62: laser
64: light source
65: λ/2 plate
68: polarization beam splitter
70A, 70B: mirror
72A, 72B: λ/4 plate
80: dove prism
82: linear polarizer
84: λ/4 plate
86: measuring instrument
$R_R$: right circularly polarized light of red light
M: laser light
MA, MB: beam
$P_O$: linearly polarized light
$P_R$: right circularly polarized light
$P_L$: left circularly polarized light
α: intersecting angle
U: user
D: arrangement axis
Λ: single period
P: pitch
$L_1$, $L_4$: incidence light
$L_2$, $L_5$: emitted light
L: laser light
Lr: emitted light

What is claimed is:

1. A light guide element comprising:
a light guide plate; and
a diffraction element that is disposed on a main surface of the light guide plate,
wherein the diffraction element includes a liquid crystal layer that is formed of a liquid crystal composition including a liquid crystal compound and has a liquid crystal alignment pattern in which a direction of an optical axis derived from the liquid crystal compound changes while continuously rotating in at least one in-plane direction,
a refractive index of the light guide plate is 1.70 or higher,
in a case where the refractive index of the light guide plate is represented by $n_d$ and a refractive index of the liquid crystal layer is represented by $n_k$,
$n_k - n_d \geq 0$
is satisfied,
the liquid crystal layer is a cholesteric liquid crystal layer obtained by immobilizing a cholesteric liquid crystalline phase,
the cholesteric liquid crystal layer is a pitch gradient layer in which a helical pitch changes in a thickness direction, and
in a main surface of the liquid crystal layer in which the direction of the optical axis of the liquid crystal compound changes while continuously rotating in at least one in-plane direction, in a case where a length over which the direction of the optical axis of the liquid crystal compound rotates by 180° is set as a single period Λ, a helical pitch on one surface side of the pitch gradient layer is represented by P1, and a helical pitch on the other surface side of the pitch gradient layer is represented by P2,
$P1 < \Lambda < P2$
is satisfied.

2. The light guide element according to claim 1, wherein the liquid crystal layer includes an optical axis tilted with respect to a main surface of the liquid crystal layer, the optical axis being derived from the liquid compound.

3. The light guide element according to claim 1,
wherein the liquid crystal layer includes a region where a tilt angle of the liquid crystal compound varies in a thickness direction.

4. The light guide element according to claim 1,
wherein the refractive index $n_d$ of the light guide plate and the refractive index $n_k$ of the liquid crystal layer satisfy $0.1 > n_k - n_d \geq 0$.

5. The light guide element according to claim 1,
wherein the diffraction element is an incidence diffraction element that causes light to be incident into the light guide plate.

* * * * *